(12) United States Patent
Duan et al.

(10) Patent No.: US 9,717,019 B2
(45) Date of Patent: Jul. 25, 2017

(54) DATA FLOW CONTROL METHOD, AND RELATED DEVICE AND COMMUNICATIONS SYSTEM

(71) Applicant: Huawei Device Co., Ltd., Shenzhen (CN)

(72) Inventors: Xiaoyan Duan, Beijing (CN); Chenliang Gao, Beijing (CN); Hui Jin, Beijing (CN); Qiang Yi, Beijing (CN); Guowei Ouyang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 175 days.

(21) Appl. No.: 14/583,951

(22) Filed: Dec. 29, 2014

(65) Prior Publication Data
US 2015/0109930 A1    Apr. 23, 2015

Related U.S. Application Data

(63) Continuation of application No. PCT/CN2013/084061, filed on Sep. 24, 2013.

(30) Foreign Application Priority Data

Sep. 29, 2012 (CN) .......................... 2012 1 0379743

(51) Int. Cl.
*H04W 28/10* (2009.01)
*H04W 36/00* (2009.01)
(Continued)

(52) U.S. Cl.
CPC ............. *H04W 28/10* (2013.01); *H04L 45/00* (2013.01); *H04L 47/2441* (2013.01); *H04W 36/0011* (2013.01); *H04W 36/22* (2013.01)

(58) Field of Classification Search
CPC ................. H04L 12/2856; H04L 12/66; H04L 29/06231; H04L 29/06251;
(Continued)

(56) References Cited

U.S. PATENT DOCUMENTS

2009/0300207 A1    12/2009 Giaretta et al.
2010/0080172 A1    4/2010 Jin et al.
(Continued)

FOREIGN PATENT DOCUMENTS

CN    101227494 A    7/2008
CN    102273265 A    12/2011
(Continued)

OTHER PUBLICATIONS

Foreign Communication From a Counterpart Application, European Application No. 13840543.6, Extended European Search Report dated Aug. 10, 2015, 6 pages.
(Continued)

*Primary Examiner* — Benjamin H Elliott, IV
(74) *Attorney, Agent, or Firm* — Conley Rose, P.C.

(57) ABSTRACT

A data flow control method, and related device and communication system are provided. In the solutions of a data flow control, a first gateway receives a first message sent by a user equipment (UE) through a first access network, where the first message carries first Internet Protocol (IP) flow identification information; the first gateway sends a second message to a packet data network gateway, and receives a third message sent by the packet data network gateway, where the third message carries third IP flow identification information, and the third IP flow identification information is used to identify an IP flow that is allowed by a network to be transmitted by the UE through the first access network and/or an IP flow that is allowed by a network to be
(Continued)

transmitted by the UE through a second access network; and the first gateway sends a fourth message to the UE.

23 Claims, 10 Drawing Sheets

(51) Int. Cl.
*H04L 12/701* (2013.01)
*H04W 36/22* (2009.01)
*H04L 12/851* (2013.01)

(58) Field of Classification Search
CPC .......... H04L 29/12735; H04L 65/1023; H04L 65/1033; H04L 61/3075; H04W 88/16; H04W 28/10; H04W 28/12; H04W 36/22; H04W 80/04; H04W 88/182
See application file for complete search history.

(56) References Cited

U.S. PATENT DOCUMENTS

| | | | | |
|---|---|---|---|---|
| 2010/0199332 | A1* | 8/2010 | Bachmann | H04L 63/0428 726/4 |
| 2010/0208698 | A1 | 8/2010 | Lu et al. | |
| 2010/0323700 | A1* | 12/2010 | Bachmann | H04W 36/0066 455/436 |
| 2011/0103340 | A1* | 5/2011 | Zhu | H04W 36/0011 370/329 |
| 2011/0182268 | A1* | 7/2011 | Akhtar | H04W 36/0022 370/331 |
| 2011/0228935 | A1* | 9/2011 | Fukunaga | H04L 9/0844 380/255 |
| 2013/0070596 | A1* | 3/2013 | Yeh | H04W 36/0038 370/235 |
| 2013/0078998 | A1* | 3/2013 | Rui | H04L 63/20 455/426.1 |
| 2013/0223290 | A1 | 8/2013 | Zhou et al. | |
| 2013/0265986 | A1* | 10/2013 | Pampu | H04W 36/30 370/331 |
| 2015/0109930 | A1* | 4/2015 | Duan | H04W 28/10 370/235 |

FOREIGN PATENT DOCUMENTS

| | | |
|---|---|---|
| CN | 102469431 A | 5/2012 |
| CN | 102469531 A | 5/2012 |
| CN | 102655665 A | 9/2012 |
| EP | 1432198 A1 | 12/2002 |
| WO | 2010080966 A1 | 7/2010 |
| WO | 2011137928 A1 | 11/2011 |

OTHER PUBLICATIONS

Partial English Translation and Abstract of Chinese Patent Application No. CN101227494A, Feb. 3, 2015, 4 pages.
Partial English Translation and Abstract of Chinese Patent Application No. CN102469531, Part 1, Feb. 3, 2015, 8 pages.
Partial English Translation and Abstract of Chinese Patent Application No. CN102469531A, Part 2, Feb. 3, 2015, 5 pages.
Partial English Translation and Abstract of Chinese Patent Application No. CN102655665A, Part 1, Feb. 3, 2015, 6 pages.
Partial English Translation and Abstract of Chinese Patent Application No. CN102655665A, Part 2, Feb. 3, 2015, 3 pages.
"3rd Generation Partnership Project; Technical Specification Group Services and System Aspects; and seamless Wireless Local Area Network (WLAN) offload; Stage 2 (Release 10)," 3GPP TS 23.261, V10.1.0, Sep. 2010, 22 pages.
"3rd Generation Partnership Project; Technical Specification Group Services and System Aspects; Network based IP flow mobility (Release 12)," 3GPP TR 23.861, V1.5.0, Aug. 2012, 51 pages.
Foreign Communication From a Counterpart Application, PCT Application No. PCT/CN2013/084061, English Translation of International Search Report dated Dec. 26, 2013, 3 pages.
Foreign Communication From a Counterpart Application, PCT Application No. PCT/CN2013/084061, English Translation of Written Opinion dated Dec. 26, 2013, 19 pages.

* cited by examiner

DATA FLOW CONTROL METHOD, AND RELATED DEVICE AND COMMUNICATIONS SYSTEM

CROSS-REFERENCE TO RELATED APPLICATIONS

This application is a continuation of International Application No. PCT/CN2013/084061, filed on Sep. 24, 2013, which claims priority to Chinese Patent Application No. 201210379743.5, filed on Sep. 29, 2012, both of which are hereby incorporated by reference in their entireties.

TECHNICAL FIELD

The present invention relates to the field of communications technologies, and in particular, to a data flow control method, a related device and communications system.

BACKGROUND

The 3rd Generation Partnership Project (3GPP) standards organization defines the specifications for mobile telecommunications network (3GPP network), which is a most commonly applied wide-area mobile telecommunications network. As an easy-to-access, high-speed and low-cost local area communications network, a wireless local area network (WLAN) is also widely deployed and used. A user can access the 3GPP network or the WLAN by using a user equipment (UE) to perform voice services, data services, multimedia services, and so on, for example, the user can access the Internet, or perform a voice or a video call.

In consideration of network traffic control and flexibility of implementing services by the UE, the industry currently discusses supporting a UE to access a 3GPP core network through a 3GPP access network and access the 3GPP core network through a non-3GPP access network (such as the WLAN), and further to access the Internet through the 3GPP core network, thereby implementing interworking between the 3GPP network and the non-3GPP access network (such as the WLAN), so that the 3GPP network offloads data to the non-3GPP access network, and uniform charging, quality of service (QoS) control, and the like are performed. The industry further discusses how to support a UE to perform communication using WLAN access and 3GPP access simultaneously, to transmit an Internet Protocol-based service flow, namely, an Internet Protocol (IP) flow, and implement seamless switching of the IP flow between the WLAN access network and the 3GPP access network. For example, at a certain moment, the UE performs voice over IP (VoIP) by using the 3GPP access network, and transmits a video stream or downloads data by using the WLAN access network; later, due to a change of a network condition, a carrier policy, or user preference, the UE moves, to the 3GPP access network, the data service transmitted in the WLAN access network. Such a feature is known as an IP flow mobility feature.

Then, in a solution to supporting the IP flow mobility under discussion in the industry, a UE is required to support, for example, dual stack mobile IP version 6 (DSMIPv6), but most existing UEs do not support the DSMIPv6 protocol (due to the cost, technology, or other factors). Consequently, it is difficult to implement this DSMIPv6-based IP flow mobility solution in the existing communications network.

SUMMARY

Embodiments of the present invention provide a data flow control method, and a related device and communications system, so as to lower a requirement on a UE capability in implementation of IP flow mobility, and make it more feasible for a system (including a network and a terminal) to support the feature of IP flow mobility.

A first aspect of the present invention provides a data flow control method, including receiving, by a first gateway, a first message sent by a UE through a first access network, where the first message carries first IP flow identification information, and the first IP flow identification information is used to identify an IP flow that is transmitted by the UE through the first access network and/or an IP flow that is transmitted by the UE through a second access network, where the first access network and the second access network are access networks using different access technologies; sending, by the first gateway, a second message to a packet data network gateway (PDN GW), where the second message carries second IP flow identification information, and the second IP flow identification information is the same as the first IP flow identification information or the second IP flow identification information is obtained based on the first IP flow identification information; receiving, by the first gateway, a third message sent by the PDN GW, where the third message carries third IP flow identification information, and the third IP flow identification information is used to identify an IP flow that is allowed by a network to be transmitted by the UE through the first access network and/or the second access network; and sending, by the first gateway, a fourth message to the UE, where the fourth message carries fourth IP flow identification information, and the fourth IP flow identification information is the same as the third IP flow identification information or the fourth IP flow identification information is obtained based on the third IP flow identification information.

In a first possible implementation manner of the first aspect, at least one message of the first message, the second message, the third message, and the fourth message further carries an IP flow routing address, where the IP flow routing address includes at least one of the following addresses: a local address of the UE, an address of the first gateway, and a home address of the UE.

With reference to the first aspect or the first possible implementation manner of the first aspect, in a second possible implementation manner, that the second IP flow identification information is obtained based on the first IP flow identification information includes that a home address or a public address included in the second IP flow identification information is converted from a local address and/or a port number included in the first IP flow identification information; and/or QoS information included in the second IP flow identification information is converted from QoS information included in the first IP flow identification information; and/or an encoding mode indication included in the second IP flow identification information is converted from an encoding mode indication included in the first IP flow identification information; and/or that the fourth IP flow identification information is obtained based on the third IP flow identification information includes that a local address and/or a port number included in the fourth IP flow identification information is converted from a home address or a public address included in the third IP flow identification information; and/or QoS information included in the fourth IP flow identification information is converted from QoS information included in the third IP flow identification information; and/or an encoding mode indication included in the fourth IP flow identification information is converted from an encoding mode indication included in the third IP flow identification information.

With reference to the first aspect, or the first possible implementation manner or the second possible implementation manner of the first aspect, in a third possible implementation manner, the first message and/or the second message further carries a packet data network (PDN) connection indication, where the PDN connection indication is used to indicate a PDN connection that has been established by the UE through the second access network, and the IP flow transmitted by the UE through the first access network uses the PDN connection.

With reference to the third possible implementation manner of the first aspect, in a fourth possible implementation manner, the PDN connection indication includes a home address of the UE and/or a handover indication.

With reference to the first aspect, or the first possible implementation manner of the first aspect or the second possible implementation manner of the first aspect or the third possible implementation manner of the first aspect or the fourth possible implementation manner of the first aspect, in a fifth possible implementation manner, the first message and/or the second message further carries an IP flow mobility indication.

With reference to the first aspect, or the first possible implementation manner of the first aspect or the second possible implementation manner of the first aspect or the third possible implementation manner of the first aspect or the fourth possible implementation manner of the first aspect or the fifth possible implementation manner of the first aspect, in a sixth possible implementation manner, the first IP flow identification information is IP flow identification information obtained by modifying IP flow identification information currently used by the UE.

With reference to the first aspect, or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect, in a seventh possible implementation manner, the receiving a first message sent by a UE through a first access network includes receiving an Internet Key Exchange protocol authentication request message sent by the UE, or receiving an Internet Key Exchange protocol informational request message sent by the UE; and/or the sending a fourth message to the UE includes sending an Internet Key Exchange protocol authentication response message to the UE, or sending an Internet Key Exchange protocol informational response message to the UE.

With reference to the first aspect or the seventh possible implementation manner of the first aspect, in an eighth possible implementation manner, the first IP flow identification information is carried in a traffic selector of the first message; and/or the fourth IP flow identification information is carried in a traffic selector of the fourth message.

With reference to the first aspect, or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect or the eighth possible implementation manner of the first aspect, in a ninth possible implementation manner, before the receiving, by a first gateway, a first message sent by a UE through a first access network, the method further includes receiving, by the first gateway, a fifth message sent by the UE through the first access network, where the fifth message carries fifth IP flow identification information, and the fifth IP flow identification information is used to identify an IP flow that is transmitted by the UE through the first access network and/or an IP flow that is transmitted by the UE through the second access network; and sending, by the first gateway, an authentication request message to an authentication server, and negotiating with the UE according to an operator policy returned by the authentication server and/or subscription data of the UE, to obtain the first IP flow identification information.

With reference to the first aspect, or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect or the eighth possible implementation manner of the first aspect or the ninth possible implementation manner of the first aspect, in a tenth possible implementation manner, the sending a second message to a PDN GW includes sending a Proxy Mobile IP version 6 (PMIPv6) Proxy Binding Update (PBU) message to the PDN GW; and the receiving a third message sent by the PDN GW includes receiving a PMIPv6 Proxy Binding acknowledge (ACK) message sent by the PDN GW; or the sending a second message to a PDN GW includes sending a General Packet Radio Service Tunneling Protocol (GTP) Create Session Request message to the PDN GW; and the receiving a third message sent by the PDN GW includes receiving a GTP Create Session Response message sent by the PDN GW; or the sending a second message to a PDN GW includes sending a GRP Bearer Resource Command message to the PDN GW; and the receiving a third message sent by the PDN GW includes receiving a GTP Update Bearer Request message sent by the PDN GW; or the sending a second message to a PDN GW includes sending a GTP Modify Bearer Request message to the PDN GW; and the receiving a third message sent by the PDN GW includes receiving a GTP Modify Bearer Response message sent by the PDN GW.

With reference to the first aspect, or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect or the eighth possible implementation manner of the first aspect or the ninth possible implementation manner of the first aspect or the tenth possible implementation manner of the first aspect, in an eleventh possible implementation manner, one of the first access network and the second access network is a 3GPP access network, and the other is a non-3GPP access network.

With reference to the eleventh possible implementation manner of the first aspect, in a twelfth possible implementation manner, the non-3GPP access network is a WLAN access network.

A second aspect of the present invention provides a data flow control method, including receiving, by a PDN GW, a second message sent by a first gateway, where the second message carries second IP flow identification information, and the second IP flow identification information is used to identify an IP flow that is transmitted by a UE through a first access network and/or an IP flow that is transmitted by the UE through a second access network, where the first access network and the second access network are access networks using different access technologies; establishing, by the PDN GW, a binding relationship between an IP flow routing address and third IP flow identification information or the second IP flow identification information, where the third IP flow identification information is IP flow identification information accepted by a network, the third IP flow identification information is used to identify an IP flow that is allowed by the network to be transmitted by the UE through the first access network and/or an IP flow that is allowed by the network to be transmitted by the UE through the second access network, and the IP flow routing address includes at least one of the following addresses: a local address of the UE, an address of the first gateway, and a home address of the UE; and sending a third message to the first gateway, where the third message carries the third IP flow identification information.

In a first possible implementation manner of the second aspect, the method further includes associating, by the PDN GW, an IP flow established by the UE through the first access network with a PDN connection established by the UE through the second access network or an IP flow established by the UE through the second access network, where the IP flow established by the UE through the first access network uses the PDN connection.

With reference to the second aspect, or the first possible implementation manner of the second aspect, in a second possible implementation manner, before the sending a third message to the first gateway, the method further includes sending, by the PDN GW, the second IP flow identification information and the IP flow routing address to a policy and charging rules function (PCRF) entity; receiving, by the PDN GW, sixth IP flow identification information returned by the PCRF entity; and determining, by the PDN GW, the third IP flow identification information according to the sixth IP flow identification information.

A third aspect of the present invention provides a gateway device, including a first receiving unit configured to receive a first message sent by a UE through a first access network, where the first message carries first IP flow identification information, and the first IP flow identification information is used to identify an IP flow that is requested to be transmitted by the UE through the first access network and/or an IP flow that is requested to be transmitted by the UE through a second access network, where the first access network and the second access network are access networks using different access technologies; a first sending unit configured to send a second message to a PDN GW, where the second message carries second IP flow identification information, and the second IP flow identification information is the same as the first IP flow identification information or the second IP flow identification information is obtained based on the first IP flow identification information; a second receiving unit configured to receive a third message sent by the PDN GW, where the third message carries third IP flow identification information, and the third IP flow identification information is used to identify an IP flow that is allowed by a network to be transmitted by the UE through the first access network and/or an IP flow that is allowed by the network to be transmitted by the UE through the second access network; and a second sending unit configured to send a fourth message to the UE, where the fourth message carries fourth IP flow identification information, and the fourth IP flow identification information is the same as the third IP flow identification information or the fourth IP flow identification information is obtained based on the third IP flow identification information.

In a first possible implementation manner of the third aspect, at least one message of the first message, the second message, the third message, and the fourth message further carries an IP flow routing address, where the IP flow routing address includes at least one of the following addresses: a local address of the UE, an address of the gateway device, and a home address of the UE.

With reference to the third aspect, or the first possible implementation manner of the third aspect or the second possible implementation manner of the third aspect, in a third possible implementation manner, the first message and/or the second message further carries a PDN connection indication, where the PDN connection indication is used to indicate a PDN connection that has been established by the UE through the second access network, and the IP flow transmitted by the UE through the first access network uses the PDN connection.

With reference to the third aspect, or the first possible implementation manner of the third aspect or the second possible implementation manner of the third aspect or the third possible implementation manner of the third aspect, in a fourth possible implementation manner, the first message and/or the second message further carries an IP flow mobility indication.

With reference to the third aspect, or the first possible implementation manner of the third aspect or the second possible implementation manner of the third aspect or the third possible implementation manner of the third aspect or the fourth possible implementation manner of the third aspect, in a fifth possible implementation manner, the first IP flow identification information is IP flow identification information obtained by modifying IP flow identification information currently used by the UE.

With reference to the third aspect, or the first possible implementation manner of the third aspect or the second possible implementation manner of the third aspect or the third possible implementation manner of the third aspect or the fourth possible implementation manner of the third aspect or the fifth possible implementation manner of the third aspect, in a sixth possible implementation manner, the first receiving unit is configured to receive an Internet Key Exchange protocol authentication request message sent by the UE, or receive an Internet Key Exchange protocol informational request message sent by the UE; and/or the second sending unit is configured to send an Internet Key Exchange protocol authentication response message to the UE, or send an Internet Key Exchange protocol informational response message to the UE.

With reference to the third aspect, or the first possible implementation manner of the third aspect or the second possible implementation manner of the third aspect or the third possible implementation manner of the third aspect or the fourth possible implementation manner of the third aspect or the fifth possible implementation manner of the third aspect or the sixth possible implementation manner of the third aspect, in a seventh possible implementation manner, the first receiving unit is further configured to, before receiving the first message sent by the UE through the first access network, receive a fifth message sent by the UE through the first access network, where the fifth message carries fifth IP flow identification information and the fifth IP flow identification information is used to identify an IP flow that is transmitted by the UE through the first access network and/or an IP flow that is transmitted by the UE through the second access network; and the gateway device further includes a negotiation unit configured to send an authentication request message to an authentication server, and negotiate with the UE according to an operator policy returned by the authentication server and/or subscription data of the UE returned by the authentication server, to obtain the first IP flow identification information.

With reference to the third aspect, or the first possible implementation manner of the third aspect or the second possible implementation manner of the third aspect or the third possible implementation manner of the third aspect or the fourth possible implementation manner of the third aspect or the fifth possible implementation manner of the third aspect or the sixth possible implementation manner of the third aspect or the seventh possible implementation manner of the third aspect, in an eighth possible implementation manner, the first sending unit is configured to send a PMIPv6 PBU message to the PDN GW; and the second receiving unit is configured to receive a PMIPv6 Proxy Binding ACK message sent by the PDN GW; or the first sending unit is configured to send a GTP Create Session Request message to the PDN GW; and the second receiving unit is configured to receive a GTP Create Session Response message sent by the PDN GW; or the first sending unit is configured to send a GTP Bearer Resource Command message to the PDN GW; and the second receiving unit is configured to receive a GTP Update Bearer Request message sent by the PDN GW; or the first sending unit is configured to send a GTP Modify Bearer Request message to the PDN GW; and the second receiving unit is configured to receive a GTP Modify Bearer Response message sent by the PDN GW.

With reference to the third aspect, or the first possible implementation manner of the third aspect or the second possible implementation manner of the third aspect or the third possible implementation manner of the third aspect or the fourth possible implementation manner of the third aspect or the fifth possible implementation manner of the third aspect or the sixth possible implementation manner of the third aspect or the seventh possible implementation manner of the third aspect or the eighth possible implementation manner of the third aspect, in a ninth possible implementation manner, one of the first access network and the second access network is a 3GPP access network, and the other is a non-3GPP access network.

A fourth aspect of the present invention provides a PDN GW, including a third receiving unit configured to receive a second message sent by a first gateway, where the second message carries second IP flow identification information, and the second IP flow identification information is used to identify an IP flow that is transmitted by a UE through a first access network and/or an IP flow that is transmitted by the UE through a second access network, where the first access network and the second access network are access networks using different access technologies; a binding unit configured to establish a binding relationship between an IP flow routing address and third IP flow identification information or the second IP flow identification information, where the third IP flow identification information is IP flow identification information accepted by a network, the third IP flow identification information is used to identify an IP flow that is allowed by the network to be transmitted by the UE through the first access network and/or an IP flow that is allowed by the network to be transmitted by the UE through the second access network, and the IP flow routing address includes at least one of the following addresses: a local address of the UE, an address of the first gateway, and a home address of the UE; and a third sending unit configured to send a third message to the first gateway, where the third message carries the third IP flow identification information.

In a first possible implementation manner of the fourth aspect, the binding unit is further configured to associate an IP flow established by the UE through the first access network with a PDN connection established by the UE through the second access network or an IP flow established by the UE through the second access network, where the IP flow established by the UE through the first access network uses the PDN connection.

With reference to the fourth aspect or the first possible implementation manner of the fourth aspect, in a second possible implementation manner, the PDN GW further includes a fourth sending unit configured to send the second IP flow identification information and the IP flow routing address to a PCRF entity before the third message is sent to the first gateway; a fourth receiving unit configured to receive sixth IP flow identification information returned by the PCRF entity; and a determining unit configured to determine the third IP flow identification information according to the sixth IP flow identification information received by the fourth receiving unit.

A fifth aspect of the present invention provides a communications system, including a first gateway configured to receive a first message sent by a UE through a first access network, where the first message carries first IP flow identification information, and the first IP flow identification information is used to identify an IP flow that is transmitted by the UE through the first access network and/or an IP flow that is transmitted by the UE through a second access network, where the first access network and the second access network are access networks using different access technologies; send a second message to a PDN GW, where the second message carries second IP flow identification information, and the second IP flow identification information is the same as the first IP flow identification information or the second IP flow identification information is obtained based on the first IP flow identification information; receive a third message sent by the PDN GW, where the third message carries third IP flow identification information; and send a fourth message to the UE, where the fourth message carries fourth IP flow identification information, and the fourth IP flow identification information is the same as the third IP flow identification information or the fourth IP flow identification information is obtained based on the third IP flow identification information; and the PDN GW configured to receive the second message sent by the first gateway, establish a binding relationship between an IP flow routing address and the third IP flow identification information or the second IP flow identification information, where the third IP flow identification information is IP flow identification information accepted by a network, the third IP flow identification information is used to identify an IP flow that is allowed by the network to be transmitted by the UE through the first access network and/or an IP flow that is allowed by the network to be transmitted by the UE through the second access network, and the IP flow routing address includes at least one of the following addresses: a local address of the UE, an address of the first gateway, and a home address of the UE; and send the third message to the first gateway.

It can be seen from the above that, in the solutions provided by the embodiments of the present invention, a first gateway receives a first message that is sent by a UE through a first access network and carries first IP flow identification information, where the first IP flow identification information is used to identify an IP flow that is transmitted by the UE through the first access network and/or an IP flow that is transmitted by the UE through a second access network, and the first access network and the second access network are access networks using different access technologies; and the first gateway sends a second message carrying second IP flow identification information to a PDN GW, where the second IP flow identification information is the same as the first IP flow identification information, or the second IP flow identification information may be obtained based on the first IP flow identification information. The UE interacts with the PDN GW by using the first gateway (such as an Evolved Packet Data Gateway (ePDG) or a serving gateway) as a proxy. Therefore, without function enhancement to support protocols such as DSMIPv6, the UE can flexibly request, by using the first gateway as a proxy, the PDN GW to allow the UE to transmit an IP flow through the first access network and/or an IP flow through the second access network, further implementing IP flow mobility between access networks using different access technologies. By means of function enhancement on a network entity mainly, the solutions provided by the embodiments of the present invention seek to enable the UE to perform multi-access IP flow transmission through the access networks using different access technologies, and implement seamless switching of the IP flow between the access networks using different access technologies (for example, a WLAN access network and a 3GPP access network). In this manner, a requirement on a UE capability in implementation of the IP flow mobility is lowered, and implementation costs of the solution are reduced, making it more feasible for a system (including a network and a terminal) to support the feature of IP flow mobility.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

Figure 1:
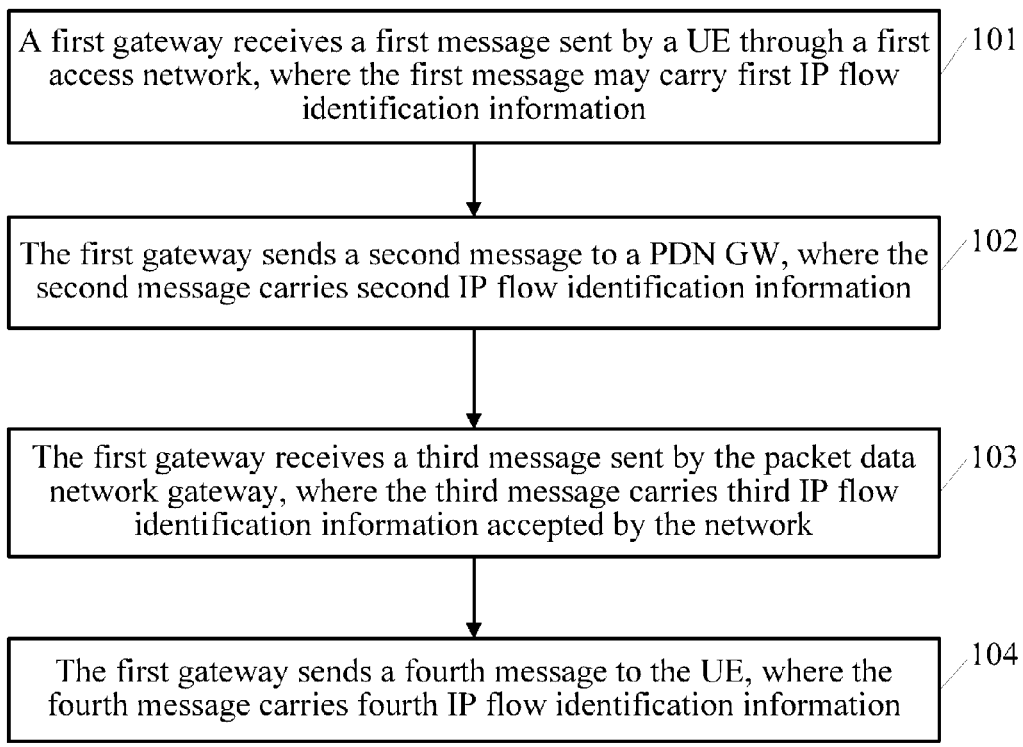
FIG. 1 is a schematic flowchart of a data flow control method according to an embodiment of the present invention.

Embodiments of the present invention provide a data flow control method, and a related device and communications system, so as to implement interworking between a 3GPP network and a non-3GPP access network without upgrading a UE, thereby reducing implementation costs of the solution.

To make a person skilled in the art understand the technical solutions in the present invention better, the following clearly and completely describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Detailed descriptions are given in the following separately.

In the specification, claims, and the foregoing accompanying drawings of the present invention, the terms "first", "second", "third", "fourth", and the like (if any) are used to distinguish similar objects, and are not necessarily used to describe a specific order or sequence. It should be understood that, the terms used in this manner can be interchanged, so that the embodiments of the present invention described herein can be implemented, for example, in other sequences than those shown or described herein. In addition, the terms "include", "contain" or any other variation thereof, are intended to cover a non-exclusive inclusion, for example, a process, a method, a system, a product or a device that includes a series of steps or units is not limited to including only those explicitly listed steps or units but may include other steps or units that are not explicitly listed, or inherent to the process, method, product, or device.

The solution is first described from the perspective of a gateway that interacts with a PDN GW.

In an embodiment of a data flow control method of the present invention, the data flow control method may include receiving, by a first gateway, a first message sent by a UE through a first access network, where the first message carries first IP flow identification information, and the first IP flow identification information is used to identify an IP flow that is transmitted by the UE through the first access network and/or an IP flow that is transmitted by the UE through a second access network, where the first access network and the second access network are access networks using different access technologies; sending, by the first gateway, a second message to a PDN GW, where the second message carries second IP flow identification information, and the second IP flow identification information is the same as the first IP flow identification information or the second IP flow identification information is obtained based on the first IP flow identification information; receiving, by the first gateway, a third message sent by the PDN GW, where the third message carries third IP flow identification information accepted by a network; and sending, by the first gateway, a fourth message to the UE, where the fourth message carries fourth IP flow identification information, and the fourth IP flow identification information is the same as the third IP flow identification information or the fourth IP flow identification information is obtained based on the third IP flow identification information.

First, referring to FIG. 1, FIG. 1 is a schematic flowchart of a data flow control method according to an embodiment of the present invention, and the data flow control method according to the embodiment of the present invention shown in FIG. 1 may include the following content.

101: A first gateway receives a first message sent by a UE through a first access network, where the first message may carry first IP flow identification information.

The first IP flow identification information may be used to identify an IP flow that is transmitted by the UE through the first access network and/or an IP flow that is transmitted by the UE through a second access network. The first IP flow identification information may identify, for example, various properties of the IP flow that is requested to be transmitted through the first access network by the UE and/or the IP flow that is requested to be transmitted through the second access network by the UE (such as a source address/a destination address, a type of service, and QoS of the IP flow).

The first access network and the second access network are access networks using different access technologies.

In some embodiments of the present invention, one of the first access network and the second access network may be a 3GPP access network, and the other may be a non-3GPP access network (for example, a WLAN access network or another non-3GPP access network).

In some embodiments of the present invention, the first gateway may be a serving gateway, may also be an ePDG, and certainly, may also be a gateway device implementing similar functions in another network.

102: The first gateway sends a second message to a PDN GW, where the second message carries second IP flow identification information, and the second IP flow identification information may be the same as the first IP flow identification information or the second IP flow identification information may be obtained based on the first IP flow identification information.

In some embodiments of the present invention, a manner of obtaining the second IP flow identification information based on the first IP flow identification information includes obtaining a home address or a public address included in the second IP flow identification information by converting a local address and/or a port number included in the first IP flow identification information; and/or obtaining QoS information included in the second IP flow identification information by converting QoS information included in the first IP flow identification information; and/or obtaining an encoding mode indication included in the second IP flow identification information by converting an encoding mode indication included in the first IP flow identification information. Certainly, the second IP flow identification information may also be obtained by performing another form of conversion on the first IP flow identification information.

It can be understood that, the second IP flow identification information may also be used to identify an IP flow that is transmitted by the UE through the first access network and/or an IP flow that is transmitted by the UE through the second access network. The second IP flow identification information may identify, for example, various properties of the IP flow that is requested to be transmitted through the first access network and/or the IP flow that is requested to be transmitted through the second access network by the UE (such as a type of service, QoS, and a source address/a destination address of the IP flow).

103: The first gateway receives a third message sent by the PDN GW, where the third message carries third IP flow identification information accepted by a network.

The third IP flow identification information accepted by the network may be regarded as IP flow identification information accepted by one network element of or jointly accepted by multiple of network elements such as the PDN GW, a PCRF entity, and a subscriber server, and the like. The third IP flow identification information is used to identify an IP flow that is accepted by the network to be transmitted by the UE through the first access network and/or an IP flow that is accepted by the network to be transmitted by the UE through the second access network.

In some embodiments of the present invention, the IP flow identified by the third IP flow identification information, which is accepted by the network to be transmitted by the UE through the first access network and/or the IP flow identified by the third IP flow identification information, which is accepted by the network to be transmitted by the UE through the second access network, is a subset of the IP flow that is identified by the first IP flow identification information/the second IP flow identification information and transmitted by the UE through the first access network and/or the IP flow that is identified by the first IP flow identification information/the second IP flow identification information and transmitted by the UE through the second access network. Certainly, there may be no necessary relationship between the IP flow that is identified by the first IP flow identification information/the second IP flow identification information and transmitted by the UE through the first access network and/or the IP flow that is identified by the first IP flow identification information/the second IP flow identification information and transmitted by the UE through the second access network and the IP flow that is identified by the third IP flow identification information and transmitted by the UE through the first access network and/or the IP flow that is identified by the third IP flow identification information and transmitted by the UE through the second access network.

104: The first gateway sends a fourth message to the UE, where the fourth message carries fourth IP flow identification information, and the fourth IP flow identification information is the same as the third IP flow identification information or the fourth IP flow identification information is obtained based on the third IP flow identification information.

In some embodiments of the present invention, a manner of obtaining the fourth IP flow identification information based on the third IP flow identification information may include obtaining a local address and/or a port number included in the fourth IP flow identification information by converting a home address or a public address included in the third IP flow identification information; and/or obtaining QoS information included in the fourth IP flow identification information by converting QoS information included in the third IP flow identification information; and/or obtaining an encoding mode indication included in the fourth IP flow identification information by converting an encoding mode indication included in the third IP flow identification information. Certainly, the fourth IP flow identification information may also be obtained by performing another form of conversion on the third IP flow identification information.

In some embodiments of the present invention, at least one message of the first message, the second message, the third message, and the fourth message further carries an IP flow routing address, where the IP flow routing address may include at least one of the following addresses: a local address of the UE, an address of the first gateway, and a home address of the UE. The IP flow routing address may be used to indicate a routing address of the IP flow that is transmitted by the UE through the first access network. If the first message does not carry the IP flow routing address, the first gateway or the PDN GW may also acquire the IP flow routing address from a network element. For example, the PDN GW may also determine the IP flow routing address according to the second message received from the first gateway, or the PDN GW uses the address of the first gateway as the IP flow routing address.

In some embodiments of the present invention, the first message and/or the second message may further carry a PDN connection indication, where the PDN connection indication is used to indicate a PDN connection that has been established by the UE through the second access network, and the IP flow transmitted by the UE through the first access network uses the PDN connection (that is, the IP flow transmitted by the UE through the first access network uses the PDN connection indicated by the PDN connection indication). The PDN connection indication may include, for example, the home address of the UE and/or a handover indication, and certainly, may also include other identification information that can indicate the PDN connection that has been established by the UE through the second access network, which are not exhaustively listed herein.

In some embodiments of the present invention, the first message and/or the second message may further carry an IP flow mobility indication, where the IP flow mobility indication may be used to indicate that the UE requests the network to support the mobility of the IP flow thereof. Certainly, it may be regarded that the network supports the mobility of the IP flow thereof (or, it may be regarded that the UE requests the network to support the mobility of the IP flow thereof); in this case, the first message and/or the second message may not carry the IP flow mobility indication.

In some embodiments of the present invention, the first IP flow identification information is IP flow identification information obtained by modifying IP flow identification information currently used by the UE, that is, the first IP flow identification information may be, for example, different from the IP flow identification information currently used by the UE. For example, before the first gateway receives the first message that is sent by the UE through the first access network, the UE has established an IP flow through the first access network and an IP flow through the second access network, and the IP flow identification information currently used by the UE may identify the IP flow that is transmitted by the UE through the first access network and/or the IP flow that is transmitted by the UE through the second access network. It may be considered that, the IP flow that is allowed by the network to be transmitted by the UE through the first access network and/or the IP flow that is allowed by the network to be transmitted by the UE through the second access network includes the IP flow that is identified by the IP flow identification information currently used by the UE and transmitted by the UE through the first access network and/or the IP flow that is identified by the IP flow identification information currently used by the UE and transmitted by the UE through the second access network.

In some embodiments of the present invention, the first gateway and the UE may transfer the first IP flow identification information and the fourth IP flow identification information based on multiple possible procedures. For example, the first gateway and the UE may transfer the first IP flow identification information and the fourth IP flow identification information based on an Internet Key Exchange version 2 (IKEv2) protocol message or a protocol message of another type. For example, the first message may be, for example, an IKEv2 authentication request message, and the fourth message may be, for example, an IKEv2 authentication response message. Or, the first message is an IKEv2 informational request message, and the fourth message may be an IKEv2 informational response message. Certainly, the first message may also be another IKEv2 protocol message or another protocol message that can be sent by the UE to the first gateway, and the fourth message may also be another IKEv2 protocol message or another protocol message that can be sent by the first gateway to the UE. Examples are not exhaustively listed herein.

In some embodiments of the present invention, if the first message is the IKEv2 authentication request message or the IKEv2 informational request message (or another IKEv2 protocol message), the first IP flow identification information is carried in a traffic selector or another information element of the first message. If the fourth message is the IKEv2 authentication response message or the IKEv2 informational response message (or another IKEv2 protocol message), the fourth IP flow identification information is carried in a traffic selector or another information element of the fourth message.

In some embodiments of the present invention, before the first gateway receives the first message sent by the UE through the first access network, the method may further include that the first gateway receives a fifth message (a message type of the fifth message is the same as or different from a message type of the first message) sent by the UE through the first access network, where the fifth message may carry fifth IP flow identification information, and the fifth IP flow identification information is used to identify the IP flow that is transmitted by the UE through the first access network and/or the IP flow that is transmitted by the UE through the second access network; and the first gateway may send an authentication request message to an authentication server, and may negotiate with the UE according to an operator policy returned by the authentication server and/or subscription data of the UE returned by the authentication server, to obtain the first IP flow identification information.

In some embodiments of the present invention, the first gateway and the PDN GW may transfer the second IP flow identification information and the third IP flow identification information based on multiple possible procedures. For example, the second message may be a PMIPv6 PBU message, and the third message may be a PMIPv6 Proxy Binding ACK message. Or, the second message may also be a GTP Create Session Request message, and the third message may be a GTP Create Session Response message. Or, the second message may be a GTP Bearer Resource Command message, and the third message may be a GTP Update Bearer Request message. Or, the second message may be a GTP Modify Bearer Request message, and the third message may be a GTP Modify Bearer Response message. It can be understood that, the first gateway may also interact with the PDN GW based on other procedures, which are not exhaustively listed herein.

It can be seen from the above that, in the solution of this embodiment, a first gateway receives a first message that is sent by a UE through a first access network and carries first IP flow identification information, where the first IP flow identification information is used to identify an IP flow that is transmitted by the UE through the first access network and/or an IP flow that is transmitted by the UE through a second access network, and the first access network and the second access network are access networks using different access technologies; and the first gateway sends a second message carrying second IP flow identification information to a PDN GW, where the second IP flow identification information is the same as the first IP flow identification information, or the second IP flow identification information may be obtained based on the first IP flow identification information. The UE interacts with the PDN GW by using the first gateway (such as an ePDG or a serving gateway) as a proxy. Therefore, without function enhancement to support protocols such as DSMIPv6, the UE can flexibly request, by using the first gateway as a proxy, the PDN GW to allow the UE to transmit an IP flow through the first access network and/or an IP flow through the second access network, further implementing IP flow mobility between access networks using different access technologies. By means of function enhancement on a network entity mainly, the present invention seeks to enable the UE to perform multi-access IP flow transmission through the access networks using different access technologies, and implement seamless switching of the IP flow between the access networks using different access technologies (for example, a WLAN access network and a 3GPP access network). In this manner, a requirement on a UE capability in implementation of the IP flow mobility is lowered, and implementation costs of the solution are reduced, making it more feasible for a system (including a network and a terminal) to support the feature of IP flow mobility.

The solution is described in the following from the perspective of a PDN GW.

In another embodiment of a data flow control method of the present invention, the data flow control method may include receiving, by a PDN GW, a second message sent by a first gateway, where the second message carries second IP flow identification information, and the second IP flow identification information is used to identify an IP flow that is transmitted by a UE through a first access network and/or an IP flow that is transmitted by a UE through a second access network, where the first access network and the second access network are access networks using different access technologies; establishing, by the PDN GW, a binding relationship between an IP flow routing address and third IP flow identification information or the second IP flow identification information, where the third IP flow identification information is IP flow identification information accepted by a network, the third IP flow identification information is used to identify an IP flow that is accepted by the network to be transmitted by the UE through the first access network and/or an IP flow that is accepted by the network to be transmitted by the UE through the second access network, and the IP flow routing address includes at least one of the following addresses: a local address of the UE, an address of the first gateway, and a home address of the UE; and sending a third message to the first gateway, where the third message carries the third IP flow identification information; and sending, by the PDN GW, the third message to the first gateway, where the third message carries the third IP flow identification information.

Figure 2:
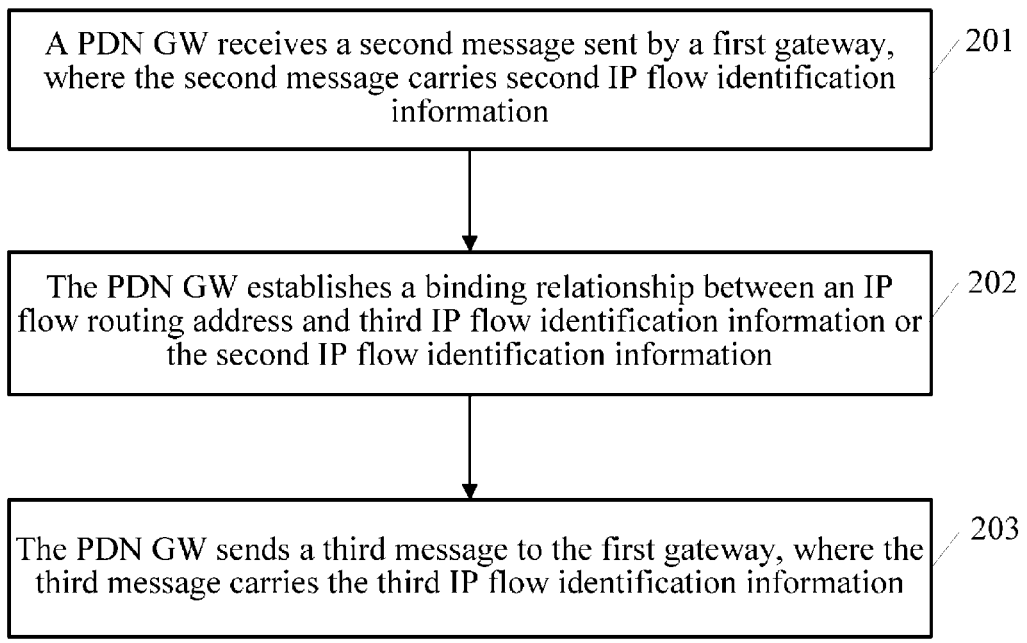
FIG. 2 is a schematic flowchart of another data flow control method according to an embodiment of the present invention.

Referring to FIG. 2 in the following, FIG. 2 is a schematic flowchart of another data flow control method according to an embodiment of the present invention, and the another data flow control method according to the embodiment of the present invention shown in FIG. 2 may include the following content.

201: A PDN GW receives a second message sent by a first gateway, where the second message carries second IP flow identification information, and the second IP flow identification information is used to identify an IP flow that is transmitted by a UE through a first access network and/or an IP flow that is transmitted by a UE through a second access network, where the first access network and the second access network are access networks using different access technologies.

In some embodiments of the present invention, after receiving the first message that is sent by the UE through the first access network and carries the first IP flow identification information, the first gateway may send a second message to the PDN GW. The first message may carry first IP flow identification information, and the first IP flow identification information is used to identify an IP flow that is transmitted by the UE through the first access network and/or an IP flow that is transmitted by the UE through the second access network. The first gateway sends the second message carrying the second IP flow identification information to the PDN GW, where the second IP flow identification information is the same as the first IP flow identification information, or the second IP flow identification information is obtained based on the first IP flow identification information.

202: The PDN GW establishes a binding relationship between an IP flow routing address and third IP flow identification information or the second IP flow identification information.

The third IP flow identification information is IP flow identification information accepted by a network, and the third IP flow identification information is used to identify an IP flow that is accepted by the network to be transmitted by the UE through the first access network and/or an IP flow that is accepted by the network to br transmitted by the UE through the second access network. The IP flow routing address includes at least one of the following address: a local address of the UE, an address of a first gateway, and a home address of the UE.

The third IP flow identification information accepted by the network may be regarded as IP flow identification information accepted by one network element of or jointly accepted by multiple of network elements such as the PDN GW, a PCRF entity, and a subscriber server.

In some embodiments of the present invention, the IP flow identified by the third IP flow identification information, which is accepted by the network to be transmitted by the UE through the first access network and/or the IP flow identified by the third IP flow identification information, which is accepted by the network to be transmitted by the UE through the second access network, is a subset of the IP flow that is identified by the first IP flow identification information/the second IP flow identification information and transmitted by the UE through the first access network and/or the IP flow that is identified by the first IP flow identification information/the second IP flow identification information and transmitted by the UE through the second access network. Certainly, there may be no necessary relationship between the IP flow that is identified by the first IP flow identification information/the second IP flow identification information and transmitted by the UE through the first access network and/or IP flow that is identified by the first IP flow identification information/the second IP flow identification information and transmitted by the UE through the second access network and the IP flow that is identified by the third IP flow identification information and transmitted by the UE through the first access network and/or the IP flow that is identified by the third IP flow identification information and transmitted by the UE through the second access network.

203: The PDN GW sends a third message to the first gateway, where the third message carries third IP flow identification information.

In some embodiments of the present invention, the PDN GW may further associate an IP flow established by the UE through the first access network with a PDN connection or an IP flow established by the UE through the second access network. Herein, it is assumed that the IP flow transmitted by the UE through the first access network uses the PDN connection established by the UE through the second access network.

In some embodiments of the present invention, before sending the third message to the first gateway, the PDN GW may further send the second IP flow identification information and the IP flow routing address to the PCRF entity; the PDN GW receives sixth IP flow identification information returned by the PCRF entity; and the PDN GW determines the third IP flow identification information according to the sixth IP flow identification information.

In some embodiments of the present invention, the first gateway and the PDN GW may transfer the second IP flow identification information and the third IP flow identification information based on multiple possible procedures. For example, the second message may be a PMIPv6 PBU message, and the third message may be a PMIPv6 Proxy Binding ACK message. Or, the second message may be a GTP Create Session Request message, and the third message may be a GTP Create Session Response message. Or, the second message may be a GTP Bearer Resource Command message, and the third message may be a GTP Update Bearer Request message. Or, the second message may be a GTP Modify Bearer Request message, and the third message may be a GTP Modify Bearer Response message. It can be understood that, the first gateway may also interact with the PDN GW based on other procedures, which are not exhaustively listed herein.

It can be seen from the above that, in the solution of this embodiment, a PDN GW receives a second message sent by a first gateway, where the second message carries second IP flow identification information, and the second IP flow identification information is used to identify an IP flow that is transmitted by a UE through a first access network and/or an IP flow that is transmitted by the UE through a second access network, where the first access network and the second access network are access networks using different access technologies; the PDN GW establishes a binding relationship between an IP flow routing address and third IP flow identification information or the second IP flow identification information; and the PDN GW sends a third message carrying the third IP flow identification information to the first gateway. The UE interacts with the PDN GW by using the first gateway (such as an ePDG or a serving gateway) as a proxy. Therefore, without function enhancement to support protocols such as DSMIPv6, the UE can flexibly request, by using the first gateway as a proxy, the PDN GW to allow the UE to transmit an IP flow through the first access network and/or an IP flow through the second access network, further implementing IP flow mobility between access networks using different access technologies. By means of function enhancement on a network entity mainly, the present invention seeks to enable the UE to perform multi-access IP flow transmission through the access networks using different access technologies, and implement seamless switching of the IP flow between the access networks using different access technologies (for example, a WLAN access network and a 3GPP access network). In this manner, a requirement on a UE capability in implementation of the IP flow mobility is lowered, and implementation costs of the solution are reduced, making it more feasible for a system (including a network and a terminal) to support the feature of IP flow mobility.

For better understanding of the foregoing solutions of the embodiments of the present invention, the solutions are described in the following with reference to several specific application scenarios.

Figure 3:
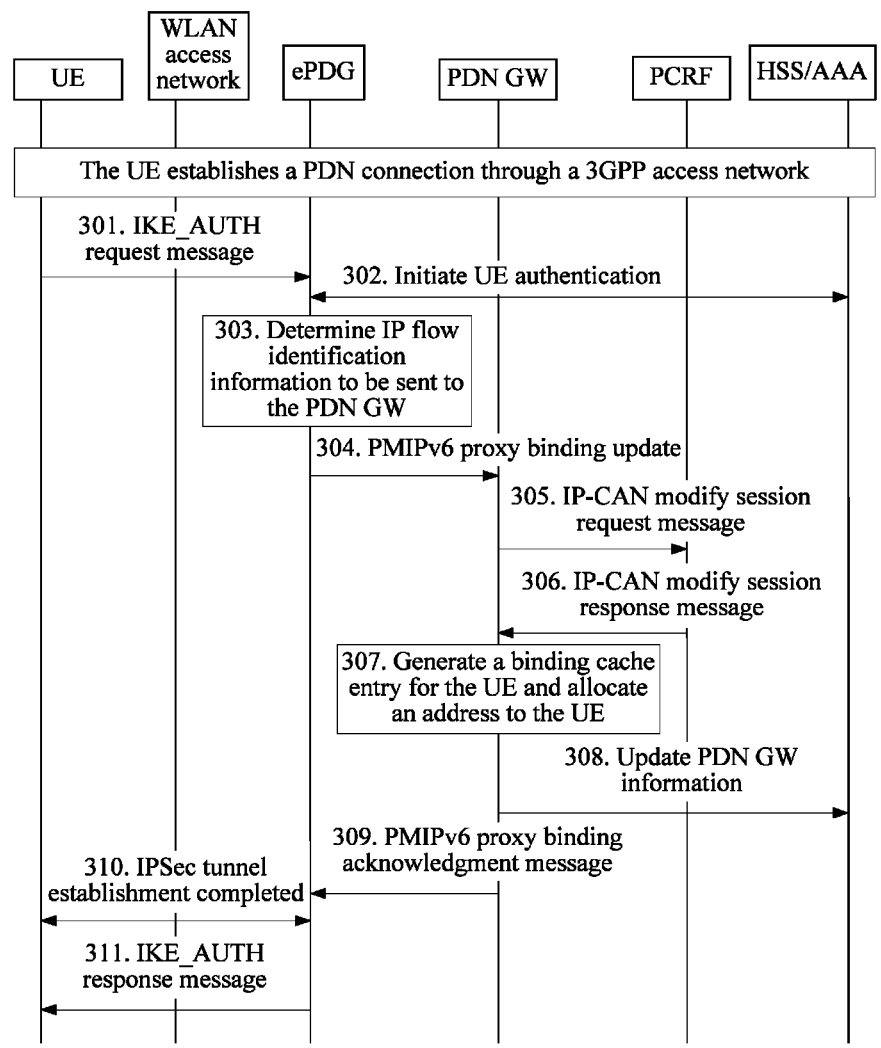
FIG. 3 is a schematic flowchart of another data flow control method according to an embodiment of the present invention.

Referring to FIG. 3, FIG. 3 is a schematic flowchart of another data flow control method according to an embodiment of the present invention. FIG. 3 shows a solution to establishing an IP flow by WLAN access and an IP flow by 3GPP access based on the PMIPv6 protocol. A data flow control method may include the following content.

301: A UE sends an Internet Key Exchange protocol authentication (IKE_AUTH) request message to an ePDG.

It is assumed that the UE has been successfully registered and has established a PDN connection through a 3GPP access network.

The IKE_AUTH request message may carry the following information.

a: IP flow identification information, where the IP flow identification information may be carried in a traffic selector of the IKE_AUTH request message; the IP flow identification information is used to identify an IP flow transmitted by the UE through the WLAN access network, that is, can describe a filtering rule of an IP packet transmitted through the WLAN access network; and the IP flow identification information may include at least one piece of the following information: a source address, a source port number, a destination address, a destination port number, a protocol type, QoS related information, and the like, of the IP flow, and may also include other filtering rules such as a service/application type, an encoding mode (codec), and/or a media type. The UE may send a request to the 3GPP network by using the IP flow identification information, to determine which IP flows are allowed to be transmitted through the WLAN access network.

b: a PDN connection indication, where the PDN connection indication is used to indicate a PDN connection that has been established by the UE in the 3GPP access network, thereby indicating that the IP flow transmitted by the UE through the WLAN uses the PDN connection, where the PDN connection indication may include a home address of the UE, a handover indication or another identity that can indicate the established PDN connection.

c: IP flow mobility indication, where the IP flow mobility indication is used to indicate that the UE requests to establish, by using a network-based mobile protocol (such as PMIPv6 or GTP), an IP flow in the WLAN access network and an IP flow in the 3GPP access network, and support the mobility of the IP flows (that is, switching of the IP flows between the WLAN and the 3GPP).

d: other information, such as a user identity, security association (SA) information, and an access point name (APN).

302: The ePDG initiates UE authentication to a 3GPP Authentication, Authorization, and Accounting (AAA) Server.

An authentication request message may carry a user identity, an APN, and other information, so as to request the 3GPP network to authenticate the UE; and may also carry an IP flow mobility indication, so as to request the network to determine whether to allow the UE to use the feature of IP flow mobility. After receiving the authentication request message from the ePDG, the 3GPP AAA Server may interact with a home subscriber server (HSS) of the UE to acquire information such as subscription data of the UE and an operator policy. The 3GPP AAA Server may send the obtained information such as the subscription data and the operator policy to the ePDG.

The subscription data of the UE and the operator policy may include at least one piece of the following information: an indication of whether the IP flow mobility is supported, and an address, a port number, a protocol type, QoS, a service/application type, a media type, an encoding mode, and the like, of the IP flow that is allowed to be transmitted through the WLAN or preferably transmitted through the WLAN.

The ePDG may determine, according to the 3GPP subscription data of the UE and/or the operator policy, the IP flow identification information requested by the UE, and if the IP flow identification information requested by the UE does not conform to corresponding information in the 3GPP subscription data of the UE and/or the operator policy, the ePDG may further send, to the UE, IP flow identification information that can be accepted by the 3GPP network.

The UE may modify the previous IP flow identification information according to the IP flow identification information accepted by the 3GPP network, and may send, to the ePDG by using an IKE_AUTH Request or an Internet Key Exchange protocol informational request message IKEv2 Informational Request or another IKEv2 message, new IP flow identification information obtained after the modification.

303: The ePDG determines, according to the IP flow identification information requested by the UE, IP flow identification information, namely, an IP flow routing filter, to be sent to the PDN GW, including, if the IP flow identification information requested by the UE includes a local address and/or a port number, the ePDG converts the local address and/or the port number into a home IP address (home address) or a public IP address (public address), and may perform, for example, a QoS mapping, an encoding mode mapping, or conversion.

304: The ePDG may select a PDN GW based on an APN, and send a PMIPv6 PBU message to the selected PDN GW.

The PMIPv6 PBU message may carry information such as an IP flow Routing filter, a routing address, a PDN connection indication, an IP flow mobility indication and a mobile node network access identifier (MN NAI, namely, user identity), an APN and/or a radio access technology (RAT) type. The IP flow Routing filter and the routing address associated with the IP flow Routing filter together form an IP flow routing rule, that is, a routing rule describes an association relationship between the routing filter and the routing address, and is used to indicate that an IP flow satisfying a certain condition, namely, the routing filter, is transmitted by using a specific address (namely, the routing address).

Here, the IP flow routing address carried in the PMIPv6 PBU message may be, for example, an address of the ePDG or a local address of the UE (namely, an address allocated by the WLAN access network to the UE), which indicates that the IP flow (namely, an IP packet data packet) satisfying the identification of the IP flow Routing filter is transmitted through the WLAN access network. Here, the address of the ePDG may be a public IP address of the ePDG, or a link-local address allocated by the PDN GW. In addition, the link-local address carried in the PMIPv6 PBU message may be all 0s (that is, all bytes are 0), so as to give an instruction of requesting the PDN GW to allocate, to the ePDG, the link-local address, namely, an address of an access link shared by the ePDG and the UE.

Here, the RAT Type is WLAN access.

If the ePDG supports establishment of multiple PDN connections for one APN, the ePDG further generates one PDN connection identity and adds the PDN connection identity to the PMIPv6 PBU message. The ePDG may further generate a flow identity (Flow ID) according to SA information such as a differentiated services code point (DSCP), and add the flow identity to the PMIPv6 PBU message.

305: If the 3GPP network uses dynamic policy and charging control, the PDN GW may initiate an IP-connection access network (IP-CAN) session modification request message to a PCRF entity, where the IP-CAN session modification request message may carry the IP flow routing rule.

306: The PCRF may send an IP-CAN session modification response message to the PDN GW.

The IP-CAN session modification response message may carry the IP flow routing rule acknowledged by the PCRF, where the PCRF may modify a downlink IP flow routing rule and/or an uplink IP flow routing rule. The PCRF may further update, according to the IP flow routing rule, an IP flow routing rule stored in the PCRF.

307: The PDN GW generates a binding cache entry for the UE based on the received PMIPv6 PBU message. The PDN GW allocates, to the UE according to the PDN connection indication, an IP address identical to that of the PDN Connection established by the UE in the 3GPP access network, that is, the home address allocated by the PDN GW to the UE is the same as the IP address of the PDN Connection that is established by the UE in the 3GPP access network and indicated by the PDN Connection indication. In addition, the PDN GW may associate the binding cache entry, that is, a binding cache entry of the PDN Connection or the IP flow established through the WLAN, with a binding cache entry of the corresponding PDN Connection or IP flow established through the 3GPP access network; or the PDN GW combines the foregoing two binding cache entries into one binding cache entry, where the foregoing two binding cache entries are distinguished from each other by using different access modes RAT Types and/or routing addresses, so as to perform charging or subsequent operations such as bearer/IP flow modification.

Certainly, the PDN GW may also associate the foregoing information in another manner.

308: The PDN GW reports a PDN GW identity and the corresponding RAT Type (which is the WLAN access here) to the 3GPP AAA Server, and the 3GPP AAA Server reports the PDN GW identity, the RAT Type, the corresponding APN, and identification information of a public land mobile network (PLMN) to an HSS.

309: The PDN GW sends a PMIPv6 proxy binding acknowledgment (PBA) message to the ePDG, where the message carries information such as IP flow identification information (namely, an IP flow Routing filter) accepted by the network, the routing address, the MN NAI, the APN, and an IP address allocated to the UE (namely, the home address of the UE).

Here, the IP flow routing address carried in the PMIPv6 PBA message may be, for example, an address of the ePDG or a local address of the UE (namely, an address allocated by the WLAN access network to the UE), which indicates that the IP flow (namely, an IP packet data packet) satisfying the identification of the IP flow Routing filter is transmitted through the WLAN access network. Here, the address of the ePDG may be a public IP address of the ePDG, or a link-local address allocated by the PDN GW (namely, an address of an access link shared by the ePDG and the UE).

In addition, if the PMIPv6 PBU message carries the PDN connection identity and the PDN GW supports establishment of multiple PDN connections for the APN, the PMIPv6 PBA message also includes the PDN connection identity.

310: The ePDG indicates authentication completion to the UE, and the UE completes the authentication on the ePDG. An IP security (IPSec) tunnel is successfully established.

311: The ePDG determines, according to the routing filter in the PBA message, a Traffic Selector to be sent to the UE. The ePDG sends an IKE_AUTH response message to the UE, where the message carries information such as the Traffic Selector, the IP address allocated by the PDN GW to the UE, namely, the home address of the UE, and the APN. If the PBA message carries the PDN connection identity, the IKE_AUTH response message further includes the PDN connection identity.

Up to now, the IP connection between the UE and the PDN GW is successfully established.

Subsequently, uplink packet data of the UE, which conforms to an uplink Traffic Selector, namely, the uplink routing rule, is sent to the ePDG through the IPSec tunnel, and is then sent by the ePDG to the PDN GW through the PMIPv6 tunnel. In a downlink direction, the PDN GW sends downlink packet data of the UE to the ePDG through the PMIPv6 tunnel according to the downlink routing rule in the binding cache entry, and then the ePDG sends the downlink packet data to the UE through the IPSec tunnel.

If in the foregoing procedures, an IP flow is moved from the 3GPP access network to the WLAN access network, the PCRF or the PDN GW may initiate release of 3GPP resources, to release corresponding bearer resources in the 3GPP network.

It can be seen from the above that, in the solution of this embodiment, an ePDG receives a message that is sent by a UE through a WLAN access network and carries first IP flow identification information, where the first IP flow identification information is used to identify an IP flow transmitted by the UE through the WLAN; and the ePDG sends a message carrying second IP flow identification information to a PDN GW, where the second IP flow identification information is the same as the first IP flow identification information, or the second IP flow identification information may be obtained based on the first IP flow identification information. The UE interacts with the PDN GW by using the ePDG as a proxy. Therefore, without function enhancement to support protocols such as DSMIPv6, the UE can flexibly request, by using the ePDG as a proxy, the PDN GW to allow the UE to transmit an IP flow through a WLAN access network and/or an IP flow through a 3GPP access network, further implementing IP flow mobility between access networks using different access technologies. By means of function enhancement on a network entity mainly, the present invention seeks to enable the UE to perform multi-access IP flow transmission through the access networks using different access technologies, and implement seamless switching of the IP flow between the WLAN access network and the 3GPP access network. In this manner, a requirement on a UE capability in implementation of the IP flow mobility is lowered, and implementation costs of the solution are reduced, making it more feasible for a system (including a network and a terminal) to support the feature of IP flow mobility.

Figure 4:
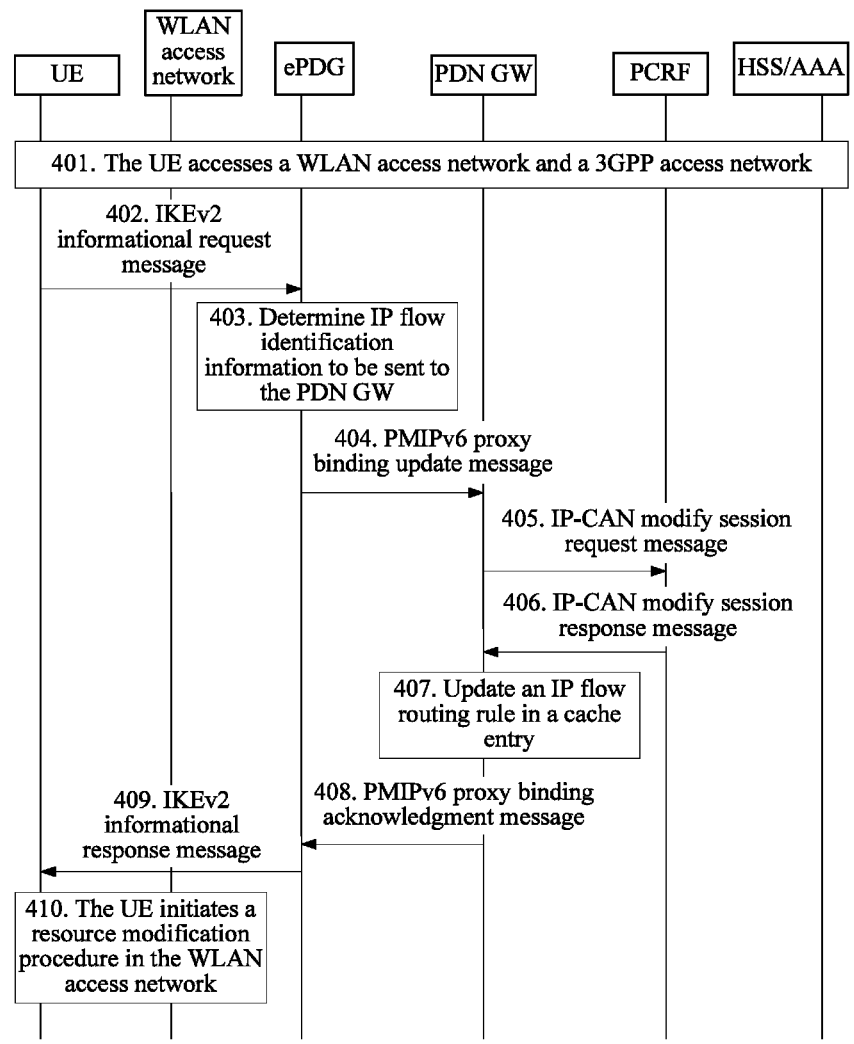
FIG. 4 is a schematic flowchart of another data flow control method according to an embodiment of the present invention.

Referring to FIG. 4, FIG. 4 is a schematic flowchart of another data flow control method according to an embodiment of the present invention. FIG. 4 shows a solution of moving an IP flow between a WLAN and a 3GPP based on PMIPv6. The data flow control method shown in FIG. 4 may include the following content.

401: A UE accesses a WLAN access network and a 3GPP access network, and may transmit an IP flow based on a current IP flow routing rule.

402: The UE sends an IKEv2 informational request message to an ePDG.

The IKEv2 informational request message may include a user identity, an APN, an SA identity, modified IP flow identification information, namely, updated IP flow identification information, and other information, where the modified IP flow identification information, namely, the updated IP flow identification information, is carried by a modified Traffic Selector, namely, an updated Traffic Selector, which means IP flow identification information, namely, a filtering rule, included in the Traffic Selector is different from IP flow identification information, namely, a filtering rule, indicated by a Traffic Selector currently used by the UE.

The modification on the current IP flow identification information includes adding information, and modifying or deleting existing information, for example, modifying one or a combination of the filtering rules such as a source address, a source port number, a destination address, a destination port number, a protocol type, QoS related information, a service/application type, a media type, and an encoding mode of the IP flow. The UE sends a request to the 3GPP network by modifying the current IP flow identification information, to determine which new IP flows are to be transmitted through the WLAN access network, or which IP flows are no longer transmitted through the WLAN access network, or the like.

In addition, if the UE supports establishment of multiple PDN connections for one APN, the IKEv2 informational request message may further carry a PDN connection identity.

In some embodiments of the present invention, the ePDG may determine, according to 3GPP subscription data of the UE and/or an operator policy, the IP flow identification information requested by the UE, and if the IP flow identification information requested by the UE does not conform to corresponding information in the 3GPP subscription data of the UE and/or the operator policy, the ePDG may further send, to the UE, IP flow identification information that can be accepted by the 3GPP network.

The UE may modify the previous IP flow identification information according to the IP flow identification information accepted by the 3GPP network, and may send, to the ePDG by using an IKE_AUTH request, or an IKEv2 Informational request or another IKEv2 message, new IP flow identification information obtained after the modification.

403: The ePDG determines, according to the IP flow identification information requested by the UE, IP flow identification information, namely, an IP flow routing filter, to be sent to a PDN GW.

For example, if the IP flow identification information requested by the UE includes a local address and/or a port number, the ePDG may convert the local address and/or the port number into a home IP address (home address) or a public IP address (public address), and perform a QoS mapping, an encoding mode mapping, or conversion.

404: The ePDG sends a PMIPv6 PBU message to the PDN GW.

The PMIPv6 PBU message may carry information such as a routing filter, an IP flow routing address, a PDN connection indication, an IP flow mobility indication, and a MN NAI, an APN, and a RAT type. The routing filter and the routing address associated with the routing filter together form a routing rule, that is, a routing rule describes an association relationship between the routing filter and the routing address, and is used to indicate that an IP flow satisfying a certain condition, namely, the routing filter, is transmitted by using a specific address, namely, the routing address. Here, the routing address in the PMIPv6 PBU message is an address of the ePDG, or a local address of the UE, namely, an address allocated by the WLAN access network to the UE, which indicates that an IP flow, namely, an IP packet data packet, satisfying the routing filter in the PMIPv6 PBU message is transmitted through the WLAN access network. Here, the address of the ePDG may be a public IP address of the ePDG, or a link-local address allocated by the PDN GW. Here, the RAT Type is WLAN access. If the ePDG supports establishment of multiple PDN connections for one APN, the ePDG may add, according to the PDN connection identity included in the IKEv2 INFORMATIONAL Request message, the PDN connection identity to the PBU message; or if the IKEv2 INFORMATIONAL Request message does not carry the PDN connection identity, the ePDG may insert the corresponding PDN connection identity in the PBU message according to a mapping relationship between an SA identity and a PDN connection.

If new IP flow identification information is added, the ePDG may further generate a flow identity (Flow ID) according to the SA identity such as a DSCP, and add the flow ID to the PMIPv6 PBU message.

405: If the 3GPP network uses dynamic policy and charging control, the PDN GW may initiate an IP-CAN session modification request to a PCRF, where the IP-CAN session modification request message carries the IP flow routing rule.

406: The PCRF may send an IP-CAN session modification response message to the PDN GW.

The IP-CAN session modification response message may carry the IP flow routing rule acknowledged by the PCRF, where the PCRF may modify a downlink routing rule and/or an uplink routing rule. The PCRF may further update, according to the IP flow routing rule, an IP flow routing rule stored in the PCRF.

407: The PDN GW updates an IP flow routing rule in a binding cache entry of the UE based on the received PMIPv6 PBU message.

408: The PDN GW sends a PMIPv6 PBA message to the ePDG, where the message carries information such as IP flow identification information accepted by the network, namely, the IP flow routing filter, a routing address, an IP address allocated to the UE (namely, a home address of the UE), an MN NAI, and an APN. Here, the routing address in the PMIPv6 PBA message is an address of the ePDG, or a local address of the UE, namely, an address allocated by the WLAN access network to the UE, which indicates that an IP flow, namely, an IP packet data packet, satisfying the routing filter in the PMIPv6 PBA message is transmitted through the WLAN access network. Here, the address of the ePDG may be a public IP address of the ePDG, or a link-local address allocated by the PDN GW, namely, an address of an access link shared by the ePDG and the UE.

If the PBU message carries the PDN connection identity and the PDN GW supports establishment of multiple PDN connections for the APN, the PBA message further includes the PDN connection identity.

409: The ePDG determines, according to the routing filter in the PBA message, a Traffic Selector to be sent to the UE.

The ePDG sends an IKEv2 informational response message to the UE, where the message may carry information such as the Traffic Selector, the IP address allocated by the PDN GW to the UE (namely, the home address of the UE), and the APN. In addition, if the PMIPv6 PBA message carries the PDN connection identity, the IKE_AUTH response message further includes the PDN connection identity.

410: The UE may initiate a resource modification procedure in the WLAN access network according to the received Traffic Selector, namely, the IP flow routing rule accepted by the network.

If in the foregoing procedure, an IP flow is moved from the 3GPP access network to the WLAN access network or from the WLAN access network to the 3GPP access network, the PCRF or the PDN GW initiates and performs a procedure of releasing or allocating corresponding 3GPP resources, to release or establish corresponding bearer resources in the 3GPP network.

The PDN GW may determine, according to an association relationship between the PDN Connections or the IP flows separately established through the WLAN access network and the 3GPP access network, to initiate the procedure of releasing or allocating corresponding 3GPP resources.

It can be seen from the above that, in the solution of this embodiment, an ePDG receives a message that is sent by a UE through a WLAN access network and carries first IP flow identification information, where the first IP flow identification information is used to identify an IP flow transmitted by the UE through the WLAN; and the ePDG sends a message carrying second IP flow identification information to a PDN GW, where the second IP flow identification information is the same as the first IP flow identification information, or the second IP flow identification information may be obtained based on the first IP flow identification information. The UE interacts with the PDN GW by using the ePDG as a proxy. Therefore, without function enhancement to support protocols such as DSMIPv6, the UE can flexibly request, by using the ePDG as a proxy, the PDN GW to allow the UE to transmit an IP flow through a WLAN access network and/or an IP flow through a 3GPP access network, further implementing IP flow mobility between access networks using different access technologies. By means of function enhancement on a network entity mainly, the present invention seeks to enable the UE to perform multi-access IP flow transmission through the access networks using different access technologies, and implement seamless switching of the IP flow between the WLAN access network and the 3GPP access network. In this manner, a requirement on a UE capability in implementation of the IP flow mobility is lowered, and implementation costs of the solution are reduced, making it more feasible for a system (including a network and a terminal) to support the feature of IP flow mobility.

Figure 5:
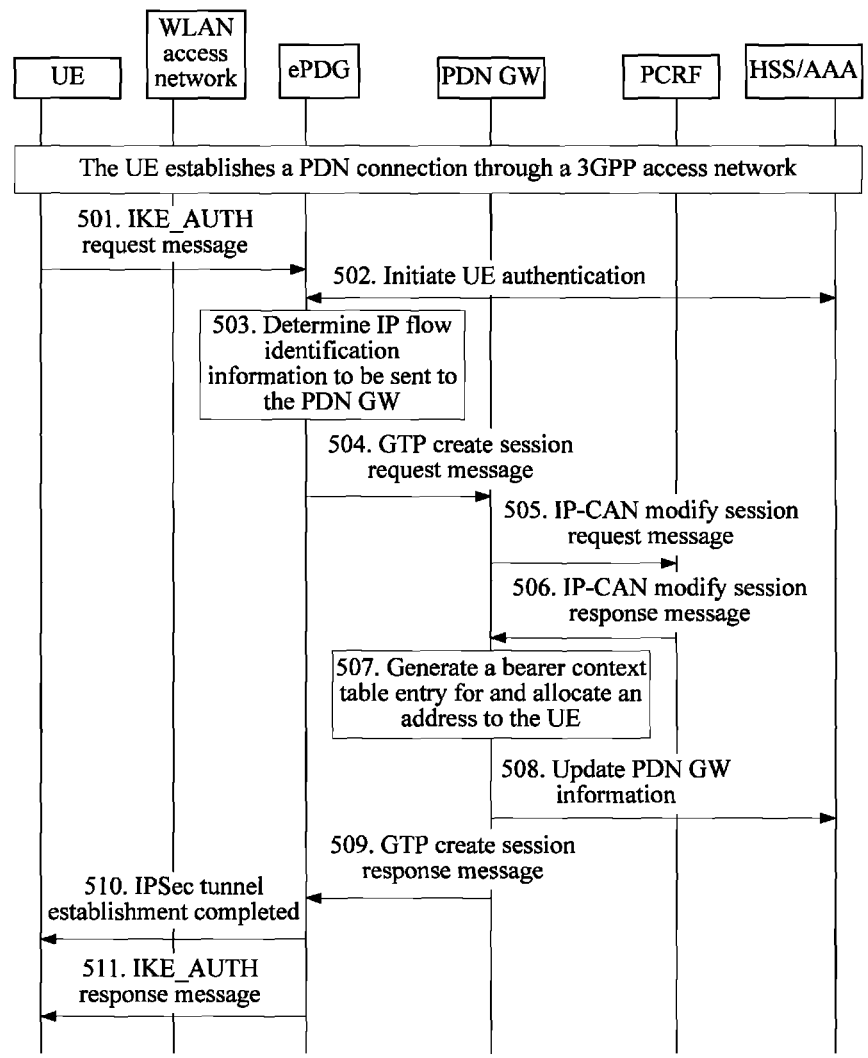
FIG. 5 is a schematic flowchart of another data flow control method according to an embodiment of the present invention.

Referring to FIG. 5, FIG. 5 is a schematic flowchart of another data flow control method according to an embodiment of the present invention. FIG. 5 shows a solution to establishing an IP flow by WLAN access and an IP flow by 3GPP access based on the GTP protocol. The data flow control method shown in FIG. 5 may include the following content.

Step 501 to step 503 are the same as step 301 to step 303 in the embodiment shown in FIG. 3.

504: The ePDG selects a PDN GW based on an APN, and sends a GTP Create Session Request message to the selected PDN GW.

The GTP Create Session Request message carries information such as a routing filter, a routing address, a PDN connection indication, an IP flow mobility indication, an international mobile subscriber identity (IMSI), an APN, and a RAT Type. The routing filter may be carried in a traffic flow template (TFT) of the GTP Create Session Request message. The routing filter and the routing address associated with the routing filter together form a routing rule, that is, a routing rule describes an association relationship between the routing filter and the routing address, and is used to indicate that an IP flow satisfying a certain condition, namely, the routing filter, is transmitted by using a specific address, namely, the routing address. Here, the routing address is an address of the ePDG, or a local address of the UE, namely, an address allocated by the WLAN access network to the UE, which indicates that an IP flow, namely, an IP packet data packet, satisfying the routing filter in the GTP Create Session Request message is transmitted through the WLAN access network.

In this case, the RAT Type is WLAN access. The ePDG may generate an EPS bearer identity (EPS bearer ID), and adds it to the Create Session Request message.

505: If the 3GPP network uses dynamic policy and charging control, the PDN GW may initiate an IP-CAN session modification request to a PCRF, where the IP-CAN session modification request message carries the IP flow routing rule.

506: The PCRF may send an IP-CAN session modification response message to the PDN GW.

The IP-CAN session modification response message may carry the IP flow routing rule acknowledged by the PCRF, where the PCRF may modify a downlink routing rule and/or an uplink routing rule. The PCRF may further update, according to the IP flow routing rule, an IP flow routing rule stored in the PCRF.

507: The PDN GW generates an entry in an EPS bearer context table based on the received GTP session create request message. The PDN GW may allocate, to the UE according to the PDN connection indication, an IP address identical to that of the PDN Connection established by the UE in the 3GPP access network; in addition, the PDN GW may associate the entry, namely, an entry of the PDN Connection or the IP flow established by the UE through the WLAN, with an entry of a corresponding PDN Connection or IP flow established through the 3GPP access network; or the PDN GW combines the foregoing two entries into a same PDN Connection or IP flow entry, where the foregoing two entries are distinguished from each other by using different access modes RAT Types and/or routing addresses, so as to perform charging or subsequent operations such as bearer/IP flow modification.

508: The PDN GW reports a PDN GW identity and the corresponding RAT Type (which is the WLAN access here) to the 3GPP AAA Server, and the 3GPP AAA Server reports the PDN GW identity, the RAT Type, the corresponding APN, and identification information of a PLMN to an HSS.

509: The PDN GW sends a GTP Create Session Response message to the ePDG, where the message carries information such as IP flow identification information accepted by the network, namely, the IP flow routing filter, the routing address, the IP address allocated to the UE, the IMSI, the APN, and the EPS bearer identity. The routing filter may be carried in a TFT. Here, the routing address is an address of the ePDG, or a local address of the UE, namely, an address allocated by the WLAN access network to the UE, which indicates that an IP flow, namely, an IP packet data packet, satisfying the routing filter in the GTP Create Session Response message, is transmitted through the WLAN access network.

510: The ePDG indicates authentication completion to the UE, and the UE completes the authentication on the ePDG. An IPSec tunnel is successfully established.

511: The ePDG determines, according to the routing filter in the Create Session Response message, a Traffic Selector to be sent to the UE. The ePDG sends an IKE_AUTH response message to the UE, where the message carries information such as the Traffic Selector, the IP address allocated by the PDN GW to the UE, and the APN.

Up to now, the IP connection between the UE and the PDN GW is successfully established. Uplink packet data of the UE, which conforms to an uplink Traffic Selector, namely, the uplink routing rule, is sent to the ePDG through the IPSec tunnel, and is then sent by the ePDG to the PDN GW through a GTP tunnel. In a downlink direction, the PDN GW sends downlink packet data of the UE to the ePDG through the GTP tunnel according to the downlink routing rule in the binding cache entry, and then the ePDG sends the downlink packet data to the UE through the IPSec tunnel.

If in the foregoing procedure, an IP flow is moved from the 3GPP access network to the WLAN access network, the PCRF or the PDN GW may initiate release of 3GPP resources, to release corresponding bearer resources in the 3GPP network.

It can be seen from the above that, in the solution of this embodiment, an ePDG receives a message that is sent by a UE through a WLAN access network and carries first IP flow identification information, where the first IP flow identification information is used to identify an IP flow transmitted by the UE through the WLAN; and the ePDG sends a message carrying second IP flow identification information to a PDN GW, where the second IP flow identification information is the same as the first IP flow identification information, or the second IP flow identification information may be obtained based on the first IP flow identification information. The UE interacts with the PDN GW by using the ePDG as a proxy. Therefore, without function enhancement to support protocols such as DSMIPv6, the UE can flexibly request, by using the ePDG as a proxy, the PDN GW to allow the UE to transmit an IP flow through a WLAN access network and/or an IP flow through a 3GPP access network, further implementing IP flow mobility between access networks using different access technologies. By means of function enhancement on a network entity mainly, the present invention seeks to enable the UE to perform multi-access IP flow transmission through the access networks using different access technologies, and implement seamless switching of the IP flow between the WLAN access network and the 3GPP access network. In this manner, a requirement on a UE capability in implementation of the IP flow mobility is lowered, and implementation costs of the solution are reduced, making it more feasible for a system (including a network and a terminal) to support the feature of IP flow mobility.

Figure 6:
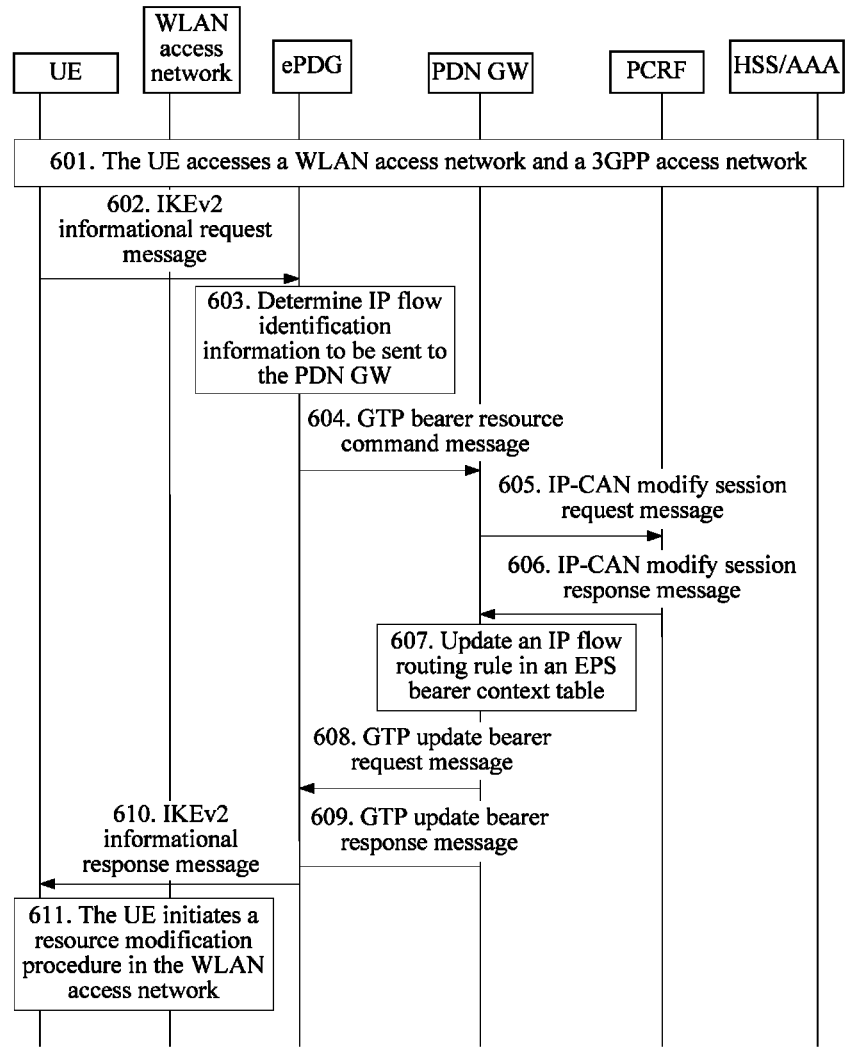
FIG. 6 is a schematic flowchart of another data flow control method according to an embodiment of the present invention.

Referring to FIG. 6, FIG. 6 is a schematic flowchart of another data flow control method according to an embodiment of the present invention. FIG. 6 shows a solution to moving an IP flow between WLAN access and 3GPP access based on the GTP protocol. The data flow control method shown in FIG. 6 may include the following content.

Step 601 to step 603 are the same as step 401 to step 403 in the embodiment shown in FIG. 4.

604: The ePDG sends a GTP Bearer Resource Command message to the PDN GW.

The GTP Bearer Resource Command message may carry information such as a routing filter, a routing address, an IMSI, an APN, an RAT Type, and an EPS Bearer ID. The routing filter may be carried in a TFT. The routing filter and the routing address associated with the routing filter together form a routing rule, that is, a routing rule describes an association relationship between the routing filter and the routing address, and is used to indicate that an IP flow satisfying a certain condition, namely, the routing filter, is transmitted by using a specific address, namely, the routing address. Here, the routing address is an address of the ePDG, or a local address of the UE, namely, an address allocated by the WLAN access network to the UE, which indicates that an IP flow, namely an IP packet data packet, satisfying the routing filter in the GTP Bearer Resource Command message is transmitted through the WLAN access network. The ePDG may insert a corresponding default EPS bearer identity default (EPS bearer ID) into the Bearer Resource Command message according to a mapping relationship between an SA and a PDN connection; the ePDG may also insert an EPS bearer ID of a dedicated bearer into the Bearer Resource Command message according to the SA information such as a DSCP.

Step 605 to step 606 are the same as step 405 to step 406 in the embodiment shown in FIG. 4.

607: The PDN GW updates a routing rule in a corresponding entry of an EPS bearer context table of the UE based on the received bearer resource command message.

608: The PDN GW sends a GTP update bearer request message to the ePDG, where the message carries IP flow identification information accepted by the network, namely, information such as a routing filter, a routing address, and an EPS Bearer ID of the IP flow. The routing filter may be carried in a TFT. Here, the routing address is an address of the ePDG, or a local address of the UE, namely, an address allocated by the WLAN access network to the UE, which indicates that an IP flow, namely, an IP packet data packet, satisfying the routing filter in the GTP Update Bearer Request message is transmitted through the WLAN access network.

609: The ePDG sends a GTP update bearer response message to the PDN GW, which indicates that modified IP flow identification information is received.

610: The ePDG determines, according to the routing filter in the Update Bearer Request message, a Traffic Selector to be sent to the UE. The ePDG sends an IKE_AUTH response message to the UE, where the message carries information such as the Traffic Selector and the APN.

611: The UE may initiate a resource modification procedure in the WLAN access network according to the received Traffic Selector, namely, the IP flow identification information accepted by the network.

If in the foregoing procedure, an IP flow is moved from the 3GPP access network to the WLAN access network or from the WLAN access network to the 3GPP access network, the PCRF or the PDN GW initiates and performs a procedure of releasing or allocating corresponding 3GPP resources, to release or establish corresponding bearer resources in the 3GPP network. The PDN GW may determine, according to an association relationship between the PDN Connections of the IP flows or the IP flows separately established through the WLAN access network and the 3GPP access network, to initiate the procedure of releasing or allocating corresponding 3GPP resources.

It can be seen from the above that, in the solution of this embodiment, an ePDG receives a message that is sent by a UE through a WLAN access network and carries first IP flow identification information, where the first IP flow identification information is used to identify an IP flow transmitted by the UE through the WLAN; and the ePDG sends a message carrying second IP flow identification information to a PDN GW, where the second IP flow identification information is the same as the first IP flow identification information, or the second IP flow identification information may be obtained based on the first IP flow identification information. The UE interacts with the PDN GW by using the ePDG as a proxy. Therefore, without function enhancement to support protocols such as DSMIPv6, the UE can flexibly request, by using the ePDG as a proxy, the PDN GW to allow the UE to transmit an IP flow through a WLAN access network and/or an IP flow through a 3GPP access network, further implementing IP flow mobility between access networks using different access technologies. By means of function enhancement on a network entity mainly, the present invention seeks to enable the UE to perform multi-access IP flow transmission through the access networks using different access technologies, and implement seamless switching of the IP flow between the WLAN access network and the 3GPP access network. In this manner, a requirement on a UE capability in implementation of the IP flow mobility is lowered, and implementation costs of the solution are reduced, making it more feasible for a system (including a network and a terminal) to support the feature of IP flow mobility.

Figure 7:
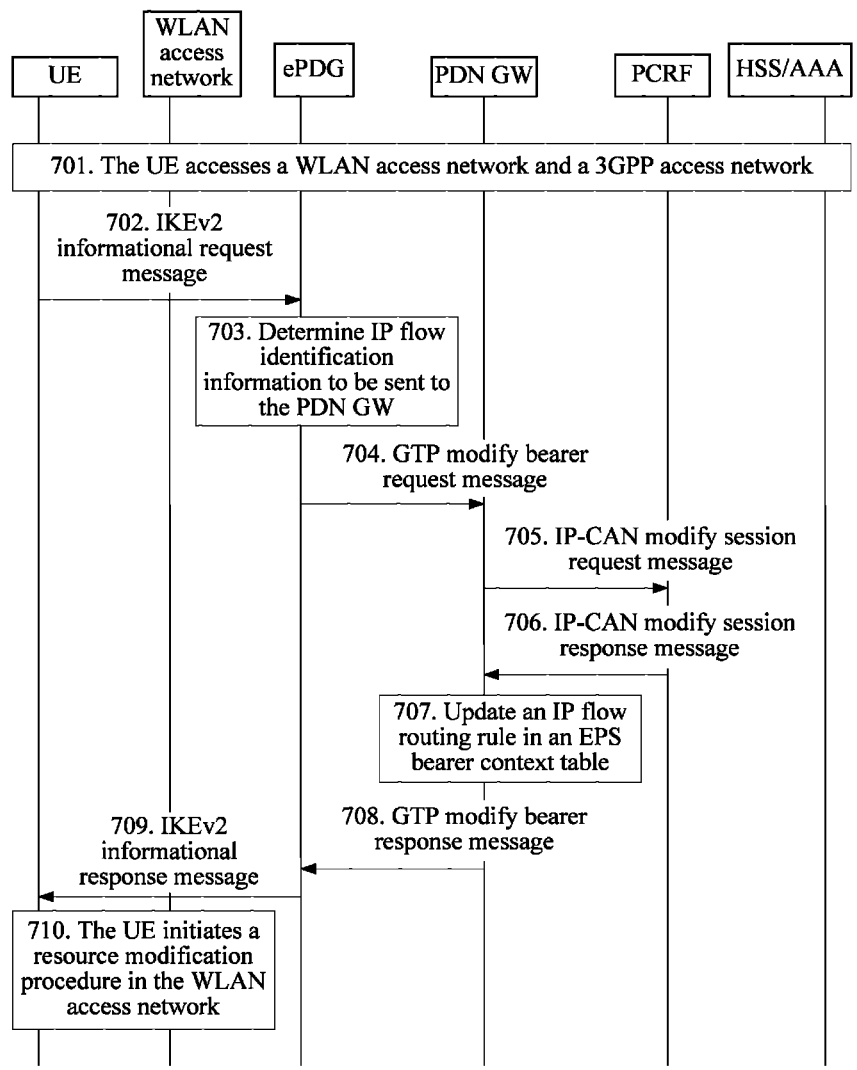
FIG. 7 is a schematic flowchart of another data flow control method according to an embodiment of the present invention.

Referring to FIG. 7, FIG. 7 is a schematic flowchart of another data flow control method according to an embodiment of the present invention. FIG. 7 shows another solution to moving an IP flow between WLAN access and 3GPP access based on the GTP protocol. The data flow control method shown in FIG. 7 may include the following content.

Moving an IP flow between WLAN access and 3GPP access based on a GTP protocol-Solution B.

Step 701 to step 703 are the same as step 601 to step 603 in the embodiment shown in FIG. 6.

704: The ePDG sends a GTP Modify Bearer Request message to the PDN GW.

The GTP Modify Bearer Request message may carry information such as a routing filter, a routing address, an IMSI, an APN, an RAT Type, and an EPS Bearer ID. The routing filter may be carried in a TFT. The routing filter and the routing address associated with the routing filter together form a routing rule, that is, a routing rule describes an association relationship between the routing filter and the routing address, and is used to indicate that an IP flow satisfying a certain condition, namely, the routing filter, is transmitted by using a specific address, namely, the routing address. Here, the routing address is an address of the ePDG, or a local address of the UE, namely, an address allocated by the WLAN access network to the UE, which indicates that an IP flow, namely, an IP packet data packet, satisfying the routing filter in the GTP Modify Bearer Request message is transmitted through the WLAN access network. The ePDG may insert a corresponding default EPS bearer identity default (EPS bearer ID) into the Modify Bearer Request message according to a mapping relationship between an SA and a PDN connection; the ePDG may also insert an EPS bearer ID of a dedicated bearer into the Modify Bearer Request message according to the SA information such as a DSCP.

Step 705 to step 706 are the same as step 605 to step 606 in the embodiment shown in FIG. 6.

707: The PDN GW updates an IP flow routing rule in a corresponding entry of an EPS bearer context table of the UE based on the received GTP Modify Bearer Request message.

708: The PDN GW sends a GTP Modify Bearer Response message to the ePDG, where the message carries IP flow identification information accepted by the network, namely, information such as a routing filter, a routing address, and an EPS Bearer ID of the IP flow. The routing filter may be carried in a TFT. Here, the routing address is an address of the ePDG, or a local address of the UE, namely, an address allocated by the WLAN access network to the UE, which indicates that an IP flow, namely, an IP packet data packet, satisfying the routing filter in the GTP Modify Bearer Response message is transmitted through the WLAN access network.

709: The ePDG determines, according to the routing filter in the Modify Bearer Response message, a Traffic Selector to be sent to the UE. The ePDG sends an IKE_AUTH response message to the UE, where the message carries information such as the Traffic Selector and the APN.

710: The UE may initiate a resource modification procedure in the WLAN access network according to the received Traffic Selector, namely, the IP flow identification information accepted by the network.

If in the foregoing procedure, an IP flow is moved from the 3GPP access network to the WLAN access network or from the WLAN access network to the 3GPP access network, the PCRF or the PDN GW initiates and performs a procedure of releasing or allocating corresponding 3GPP resources, to release or establish corresponding bearer resources in the 3GPP network. The PDN GW may determine, according to an association relationship between the PDN Connections of the IP flows or the IP flows separately established through the WLAN access network and the 3GPP access network, to initiate the procedure of releasing or allocating corresponding 3GPP resources.

It can be seen from the above that, in the solution of this embodiment, an ePDG receives a message that is sent by a UE through a WLAN access network and carries first IP flow identification information, where the first IP flow identification information is used to identify an IP flow transmitted through the WLAN by the UE; and the ePDG sends a message carrying second IP flow identification information to a PDN GW, where the second IP flow identification information is the same as the first IP flow identification information, or the second IP flow identification information may be obtained based on the first IP flow identification information. The UE interacts with the PDN GW by using the ePDG as a proxy. Therefore, without function enhancement to support protocols such as DSMIPv6, the UE can flexibly request, by using the ePDG as a proxy, the PDN GW to allow the UE to transmit an IP flow through a WLAN access network and/or an IP flow through a 3GPP access network, further implementing IP flow mobility between access networks using different access technologies. By means of function enhancement on a network entity mainly, the present invention seeks to enable the UE to perform multi-access IP flow transmission through the access networks using different access technologies, and implement switching of the IP flow between the WLAN access network and the 3GPP access network. In this manner, a requirement on a UE capability in implementation of the IP flow mobility is lowered, and implementation costs of the solution are reduced, making it more feasible for a system (including a network and a terminal) to support the feature of IP flow mobility.

An embodiment of the present invention further provides a related apparatus for implementing the foregoing solutions.

Figure 8:
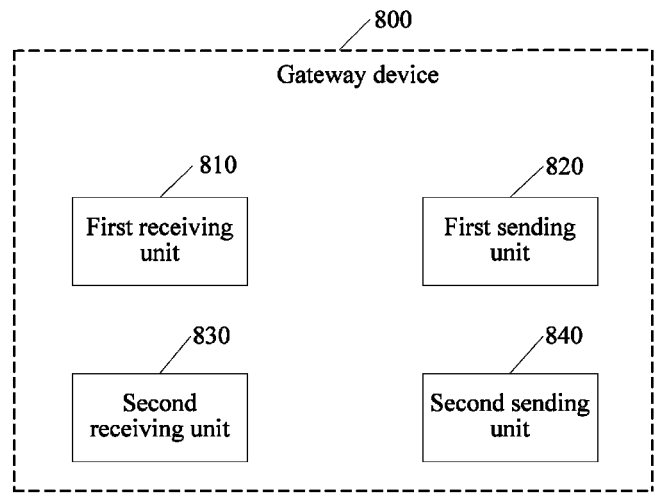
FIG. 8 is a schematic diagram of a gateway device according to an embodiment of the present invention.

Referring to FIG. 8, a gateway device 800 provided by an embodiment of the present invention may include a first receiving unit 810, a first sending unit 820, a second receiving unit 830, and a second sending unit 840.

The first receiving unit 810 is configured to receive a first message sent by a UE through a first access network, where the first message carries first IP flow identification information, and the first IP flow identification information is used to identify an IP flow that is requested to be transmitted by the UE through the first access network, or the first IP flow identification information is used to identify the IP flow that is requested to be transmitted by the UE through the first access network and an IP flow that is requested to be transmitted by the UE through a second access network, where the first access network and the second access network are access networks using different access technologies.

The first sending unit 820 is configured to send a second message to a PDN GW, where the second message carries second IP flow identification information, and the second IP flow identification information is the same as the first IP flow identification information or the second IP flow identification information is obtained based on the first IP flow identification information.

The second receiving unit 830 is configured to receive a third message sent by the PDN GW, where the third message carries third IP flow identification information accepted by a network, and the third IP flow identification information is used to identify an IP flow that is allowed by the network to be transmitted by the UE through the first access network and/or an IP flow that is allowed by the network to be transmitted by the UE through the second access network.

The second sending unit 840 is configured to send a fourth message to the UE, where the fourth message carries fourth IP flow identification information, and the fourth IP flow identification information is the same as the third IP flow identification information or the fourth IP flow identification information is obtained based on the third IP flow identification information.

In some embodiments of the present invention, at least one message of the first message, the second message, the third message, and the fourth message further carries an IP flow routing address, where the IP flow routing address includes at least one of the following addresses: a local address of the UE, an address of the first gateway, and a home address of the UE.

In some embodiments of the present invention, the first message and/or the second message further carries a PDN connection indication, where the PDN connection indication is used to indicate a PDN connection that has been established by the UE through the second access network, and the IP flow transmitted by the UE through the first access network uses the PDN connection.

In some embodiments of the present invention, the first message and/or the second message further carries an IP flow mobility indication.

In some embodiments of the present invention, the first IP flow identification information is different from the modification of IP flow identification information currently used by the UE.

In some embodiments of the present invention, the first receiving unit 810 is configured to receive an Internet Key Exchange protocol authentication request message sent by the UE, or receive an Internet Key Exchange protocol informational request message sent by the UE.

In some embodiments of the present invention, the second sending unit 840 is configured to send an Internet Key Exchange protocol authentication response message to the UE, or send an Internet Key Exchange protocol informational response message to the UE.

In some embodiments of the present invention, the first receiving unit 810 is further configured to, before receiving the first message sent by the UE through the first access network, receive a fifth message sent by the UE through the first access network, where the fifth message carries fifth IP flow identification information, and the fifth IP flow identification information is used to identify the IP flow that is requested to be transmitted through the first access network by the UE, or the fifth IP flow identification information is used to identify the IP flow that is requested to be transmitted through the first access network by the UE and the IP flow that is requested to be transmitted through the second access network by the UE.

In some embodiments of the present invention, the gateway device 800 may further include a negotiation unit configured to send an authentication request message to an authentication server, and negotiate with the UE according to an operator policy returned by the authentication server and/or subscription data of the UE, to obtain the first IP flow identification information.

In some embodiments of the present invention, the first sending unit 820 is configured to send a second message to a PDN GW includes: send a PMIPv6 PBU message to the PDN GW; and the second receiving unit 830 is configured to receive a PMIPv6 Proxy Binding ACK message sent by the PDN GW; or the first sending unit 820 is configured to send a GTP Create Session Request message to the PDN GW; and the second receiving unit 830 is configured to receive a GTP Create Session Response message sent by the PDN GW; or the first sending unit 820 is configured to send a GTP Bearer Resource Command message to the PDN GW; and the second receiving unit 830 is configured to receive a GTP Update Bearer Request message sent by the PDN GW; or the first sending unit 820 is configured to send a GTP Modify Bearer Request message to the PDN GW; and the second receiving unit 830 is configured to receive a GTP Modify Bearer Response message sent by the PDN GW.

In some embodiments of the present invention, one of the first access network and the second access network is a 3GPP access network, and the other is a non-3GPP access network.

The gateway device 800 of this embodiment may be, for example, a serving gateway, an ePDG, or another similar network device.

It can be understood that, functions of function modules of the gateway device 800 in this embodiment may be implemented by using the methods in the foregoing method embodiments. For the specific implementation process, reference may be made to the related description in the foregoing method embodiments, and details are not described herein again.

It can be seen from the above that, in the solution of this embodiment, a gateway device 800 receives a first message that is sent by a UE through a first access network and carries first IP flow identification information, where the first IP flow identification information is used to identify an IP flow that is transmitted by the UE through the first access network and/or an IP flow that is transmitted by the UE through a second access network, and the first access network and the second access network are access networks using different access technologies; and the gateway device 800 sends a second message carrying second IP flow identification information to a PDN GW, where the second IP flow identification information is the same as the first IP flow identification information, or the second IP flow identification information may be obtained based on the first IP flow identification information. The UE interacts with the PDN GW by using the gateway device (such as an ePDG or a serving gateway) as a proxy. Therefore, without function enhancement to support protocols such as DSMIPv6, the UE can flexibly request, by using the gateway device 800 as a proxy, the PDN GW to allow the UE to transmit an IP flow through the first access network and/or an IP flow through the second access network, further implementing IP flow mobility between access networks using different access technologies. By means of function enhancement on a network entity mainly, the present invention seeks to enable the UE to perform multi-access IP flow transmission through the access networks using different access technologies, and implement seamless switching of the IP flow between the access networks using different access technologies (for example, a WLAN access network and a 3GPP access network). In this manner, a requirement on a UE capability in implementation of the IP flow mobility is lowered, and implementation costs of the solution are reduced, making it more feasible for a system (including a network and a terminal) to support the feature of IP flow mobility.

Figure 9:
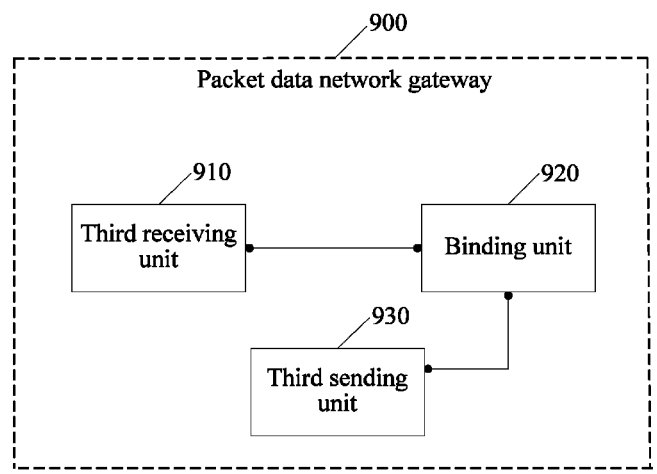
FIG. 9 is a schematic diagram of a PDN GW according to an embodiment of the present invention.

Referring to FIG. 9, an embodiment of the present invention further provides a PDN GW 900, which may include a third receiving unit 910, a binding unit 920, and a third sending unit 930.

The third receiving unit 910 is configured to receive a second message sent by a first gateway, where the second message carries second IP flow identification information, and the second IP flow identification information is used to identify an IP flow that is transmitted by a UE through a first access network and/or an IP flow that is transmitted by the UE through a second access network, where the first access network and the second access network are access networks using different access technologies.

The binding unit 920 is configured to establish a binding relationship between an IP flow routing address and third IP flow identification information or the second IP flow identification information, where the third IP flow identification information is IP flow identification information accepted by a network, the third IP flow identification information is used to identify an IP flow that is allowed by the network to be transmitted by the UE through the first access network and/or an IP flow that is allowed by the network to be transmitted by the UE through the second access network, and the IP flow routing address includes at least one of the following addresses: a local address of the UE, an address of the first gateway, and a home address of the UE.

The third sending unit 930 is configured to send a third message to the first gateway, where the third message carries the third IP flow identification information.

In some embodiments of the present invention, the binding unit 920 is further configured to associate an IP flow established by the UE through the first access network with a PDN connection established by the UE through the second access network or an IP flow established by the UE through the second access network, where the IP flow established by the UE through the first access network uses the PDN connection.

In some embodiments of the present invention, the PDN GW 900 may further include a fourth sending unit, a fourth receiving unit, and a determining unit (not shown in the figure).

The fourth sending unit is configured to send the second IP flow identification information and the IP flow routing address to a PCRF entity before the third message is sent to the first gateway.

The fourth receiving unit is configured to receive sixth IP flow identification information returned by the PCRF entity.

The determining unit is configured to determine the third IP flow identification information according to the sixth IP flow identification information received by the fourth receiving unit.

It can be understood that, functions of function modules of the PDN GW 900 in this embodiment may be implemented by using the methods in the foregoing method embodiments. For the specific implementation process, reference may be made to the related description in the foregoing method embodiments, and details are not described herein again.

It can be seen from the above that, in this embodiment, a PDN GW receives a second message sent by a first gateway, where the second message carries second IP flow identification information, and the second IP flow identification information is used to identify an IP flow that is transmitted by a UE through a first access network and/or an IP flow that is transmitted by the UE through a second access network, where the first access network and the second access network are access networks using different access technologies; the PDN GW establishes a binding relationship between an IP flow routing address and third IP flow identification information or the second IP flow identification information; and the PDN GW sends a third message carrying the third IP flow identification information to the first gateway. The UE interacts with the PDN GW by using the first gateway (such as an ePDG or a serving gateway) as a proxy. Therefore, without function enhancement to support protocols such as DSMIPv6, the UE can flexibly request, by using the first gateway as a proxy, the PDN GW to allow the UE to transmit an IP flow through the first access network and/or an IP flow through the second access network, further implementing IP flow mobility between access networks using different access technologies. By means of function enhancement on a network entity mainly, the present invention seeks to enable the UE to perform multi-access IP flow transmission through the access networks using different access technologies, and implement seamless switching of the IP flow between the access networks using different access technologies (for example, a WLAN access network and a 3GPP access network). In this manner, a requirement on a UE capability in implementation of the IP flow mobility is lowered, and implementation costs of the solution are reduced, making it more feasible for a system (including a network and a terminal) to support the feature of IP flow mobility.

Figure 10:
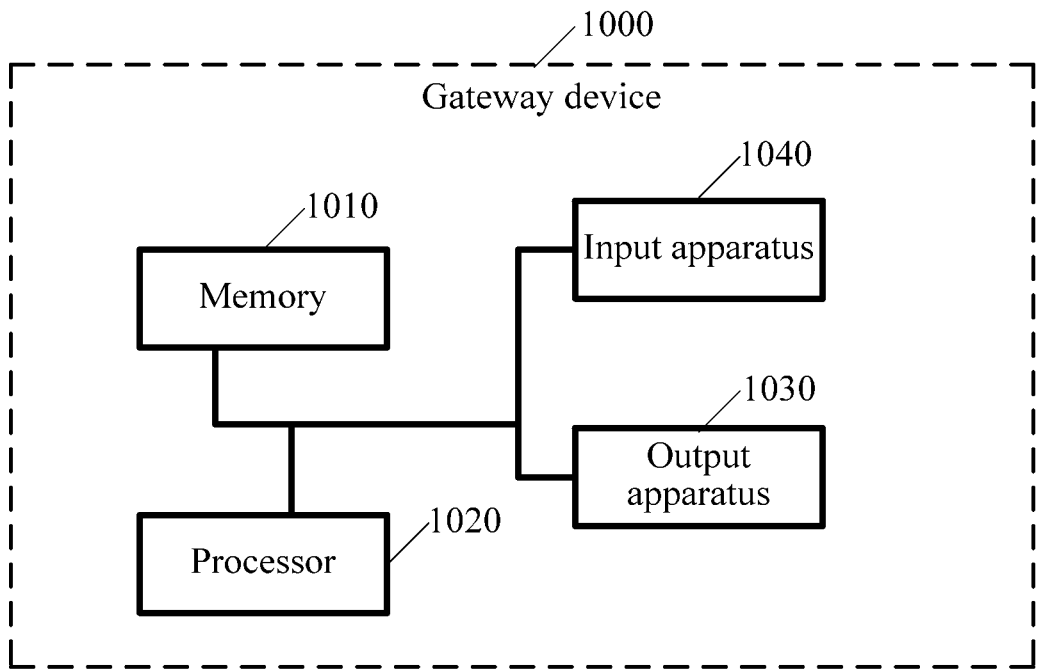
FIG. 10 is a schematic diagram of another gateway device according to an embodiment of the present invention.

Referring to FIG. 10, an embodiment of the present invention further provides a gateway device 1000, which may include an input apparatus 1040, an output apparatus 1030, a memory 1010, and a processor 1020 (the number of the processors 1020 in the network element device 1000 may be one or multiple, and one processor is used as an example in FIG. 10). In some embodiments of the present invention, the input apparatus 1040, the output apparatus 1030, the memory 1010, and the processor 1020 may be connected by using a bus or in another manner.

The processor 1020 executes the following steps.

Receiving a first message sent by a UE through a first access network, where the first message carries first IP flow identification information, and the first IP flow identification information is used to identify an IP flow that is requested to be transmitted by the UE through the first access network and/or an IP flow that is transmitted by the UE through a second access network, where the first access network and the second access network are access networks using different access technologies; sending a second message to a PDN GW, where the second message carries second IP flow identification information, and the second IP flow identification information is the same as the first IP flow identification information or the second IP flow identification information is obtained based on the first IP flow identification information; receiving a third message sent by the PDN GW, where the third message carries third IP flow identification information accepted by a network, and the third IP flow identification information is used to identify an IP flow that is allowed by the network to be transmitted by the UE through the first access network and/or an IP flow that is allowed by the network to be transmitted by the UE through the second access network; and sending a fourth message to the UE, where the fourth message carries fourth IP flow identification information, and the fourth IP flow identification information is the same as the third IP flow identification information or the fourth IP flow identification information is obtained based on the third IP flow identification information.

In some embodiments of the present invention, a manner of obtaining the second IP flow identification information based on the first IP flow identification information includes obtaining a home address or a public address included in the second IP flow identification information by converting a local address and/or a port number included in the first IP flow identification information; and/or obtaining QoS information included in the second IP flow identification information by converting QoS information included in the first IP flow identification information; and/or obtaining an encoding mode indication included in the second IP flow identification information by converting an encoding mode indication included in the first IP flow identification information. Certainly, the second IP flow identification information may be obtained by performing other forms of conversion on the first IP flow identification information.

It can be understood that, the second IP flow identification information may also be used to identify an IP flow that is transmitted by the UE through the first access network and/or an IP flow that is transmitted by the UE through the second access network. The second IP flow identification information may identify, for example, various properties of the IP flow that is requested to be transmitted through the first access network and/or the IP flow that is requested to be transmitted through the second access network by the UE (such as a type of service, QoS, and a source address/a destination address of the IP flow).

The third IP flow identification information accepted by the network may be regarded as IP flow identification information accepted by one network element of or jointly accepted by multiple of network elements such as the PDN GW, a PCRF entity, and a subscriber server. The third IP flow identification information is used to identify an IP flow that is accepted by the network to be transmitted by the UE through the first access network and/or an IP flow that is accepted by the network to be transmitted by the UE through the second access network.

In some embodiments of the present invention, the IP flow identified by the third IP flow identification information, which is accepted by the network to be transmitted by the UE through the first access network and/or the IP flow identified by the third IP flow identification information, which is accepted by the network to be transmitted by the UE through the second access network, is a subset of the IP flow that is identified by the first IP flow identification information/the second IP flow identification information and transmitted by the UE through the first access network and/or the IP flow that is identified by the first IP flow identification information/the second IP flow identification information and transmitted by the UE through the second access network. Certainly, there may be no necessary relationship between the IP flow that is identified by the first IP flow identification information/the second IP flow identification information and transmitted by the UE through the first access network and/or the IP flow that is identified by the first IP flow identification information/the second IP flow identification information and transmitted by the UE through the second access network and the IP flow that is identified by the third IP flow identification information and transmitted by the UE through the first access network and/or the IP flow that is identified by the third IP flow identification information and transmitted by the UE through the second access network.

In some embodiments of the present invention, the first IP flow identification information is IP flow identification information obtained by modifying IP flow identification information currently used by the UE, that is, the first IP flow identification information may be, for example, different from the IP flow identification information currently used by the UE. For example, before the gateway device 1000 receives the first message that is sent by the UE through the first access network, the UE has established an IP flow through the first access network and the second access network, and the IP flow identification information currently used by the UE may identify the IP flow that is transmitted by the UE through the first access network and/or the IP flow that is transmitted by the UE through the second access network. It may be considered that, the IP flow that is allowed by the network to be transmitted by the UE through the first access network and/or the IP flow that is allowed by the network to be transmitted by the UE through the second access network includes the IP flow that is identified by the IP flow identification information currently used by the UE and transmitted by the UE through the first access network and/or the IP flow that is identified by the IP flow identification information currently used by the UE and transmitted by the UE through the second access network.

In some embodiments of the present invention, the gateway device 1000 and the UE may transfer the first IP flow identification information and the fourth IP flow identification information based on multiple possible procedures. For example, the gateway device 1000 and the UE may transfer the first IP flow identification information and the fourth IP flow identification information based on an IKEv2 protocol message or a protocol message of another type. For example, the first message may be, for example, an IKEv2 authentication request message, and the fourth message may be, for example, an IKEv2 authentication response message. Or, the first message is an IKEv2 informational request message, and the fourth message may be an IKEv2 informational response message. Certainly, the first message may also be another IKEv2 protocol message or another protocol message that can be sent by the UE to the gateway device 1000, and the fourth message may also be another IKEv2 protocol message or another protocol message that can be sent by the gateway device 1000 to the UE. Examples are exhaustively listed herein.

In some embodiments of the present invention, if the first message is the IKEv2 authentication request message or the IKEv2 informational request message (or another IKEv2 protocol message), the first IP flow identification information is carried in a traffic selector or another information element of the first message. If the fourth message is the IKEv2 authentication response message or the IKEv2 informational response message (or another IKEv2 protocol message), the fourth IP flow identification information is carried in a traffic selector or another information element of the fourth message.

In some embodiments of the present invention, before the gateway device 1000 receives the first message sent by the UE through the first access network, the gateway device 1000 receives a fifth message (a message type of the fifth message is the same as or different from a message type of the first message) sent by the UE through the first access network, where the fifth message may carry fifth IP flow identification information, and the fifth IP flow identification information is used to identify the IP flow that is transmitted by the UE through the first access network and/or the IP flow that is transmitted by the UE through the second access network; and the gateway device 1000 may send an authentication request message to an authentication server, and may negotiate with the UE according to an operator policy returned by the authentication server and/or subscription data of the UE returned by the authentication server, to obtain the first IP flow identification information.

In some embodiments of the present invention, the first gateway device 1000 and the PDN GW 900 may transfer the second IP flow identification information and the third IP flow identification information based on multiple possible procedures. For example, the second message may be a PMIPv6 PBU message, and the third message may be a PMIPv6 Proxy Binding ACK message. Or, the second message may also be a GTP Create Session Request message, and the third message may be a GTP Create Session Response message. Or, the second message may be a GTP Bearer Resource Command message, and the third message may be a GTP Update Bearer Request message. Or, the second message may be a GTP Modify Bearer Request message, and the third message may be a GTP Modify Bearer Response message. It can be understood that, the gateway device 1000 may also interact with the PDN GW 900 based on other procedures, which are not exhaustively listed herein.

The gateway device 1000 of this embodiment may be, for example, a serving gateway, an ePDG, or another similar network device.

It can be understood that, functions of function modules of the gateway device 1000 in this embodiment may be implemented by using the methods in the foregoing method embodiments. For the specific implementation process, reference may be made to the related description in the foregoing method embodiments, and details are not described herein again.

Figure 11:
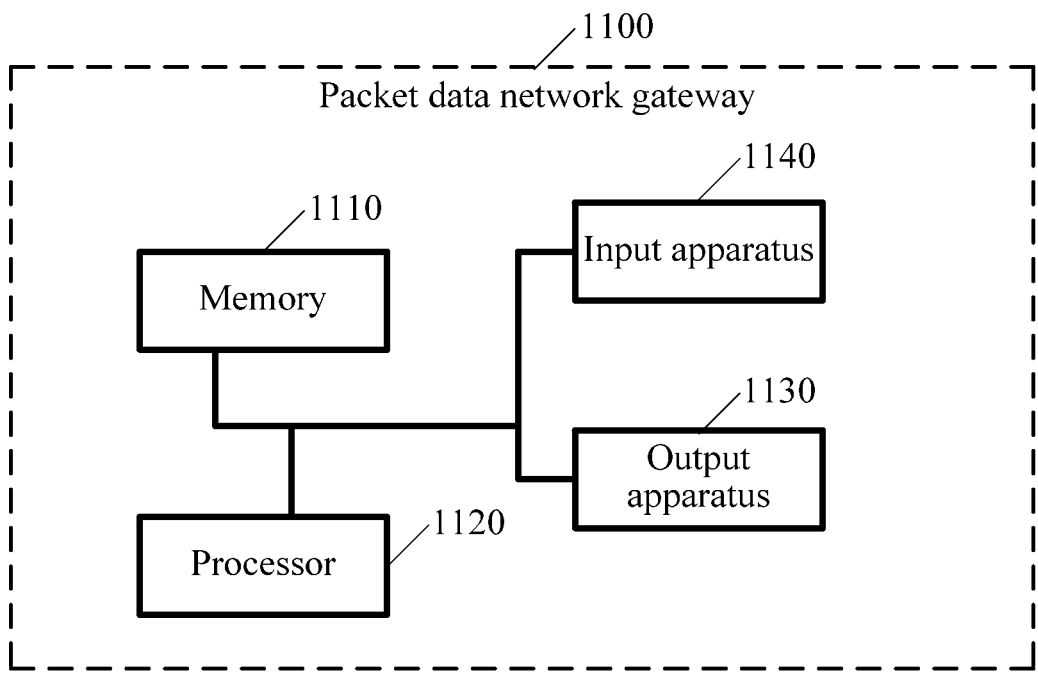
FIG. 11 is a schematic diagram of another PDN GW according to an embodiment of the present invention.

Referring to FIG. 11, an embodiment of the present invention further provides a PDN GW 1100, which may include an input apparatus 1140, an output apparatus 1130, a memory 1110, and a processor 1120 (the number of the processors 1120 in the PDN GW 1100 may be one or multiple, and one processor is used as an example in FIG. 11). In some embodiments of the present invention, the input apparatus 1140, the output apparatus 1130, the memory 1110, and the processor 1120 may be connected by using a bus or in another manner.

The processor 1120 executes the following steps.

Receiving a second message sent by a first gateway, where the second message carries second IP flow identification information, and the second IP flow identification information is used to identify an IP flow that is transmitted by a UE through a first access network and/or an IP flow that is transmitted by the UE through a second access network, where the first access network and the second access network are access networks using different access technologies; establishing a binding relationship between an IP flow routing address and third IP flow identification information or the second IP flow identification information, where the third IP flow identification information is IP flow identification information accepted by a network, the third IP flow identification information is used to identify an IP flow that is allowed by the network to be transmitted by the UE through the first access network and/or an IP flow that is allowed by the network to be transmitted by the UE through the second access network, and the IP flow routing address includes at least one of the following addresses: a local address of the UE, an address of the first gateway, and a home address of the UE; and sending a third message to the first gateway, where the third message carries the third IP flow identification information.

In some embodiments of the present invention, the processor 1120 may further associate an IP flow established by the UE through the first access network with a PDN connection or an IP flow established by the UE through the second access network. Herein, it is assumed that the IP flow transmitted by the UE through the first access network uses the PDN connection established by the UE through the second access network.

In some embodiments of the present invention, before sending the third message to the first gateway, the processor 1120 may further send the second IP flow identification information and the IP flow routing address to a PCRF entity, receive sixth IP flow identification information returned by the PCRF entity, and determine the third IP flow identification information according to the sixth IP flow identification information.

It can be understood that, functions of function modules of the PDN GW 1100 in this embodiment may be implemented by using the methods in the foregoing method embodiments. For the specific implementation process, reference may be made to the related description in the foregoing method embodiments, and details are not described herein again.

In some embodiments of the present invention, the first gateway device 1000 and the PDN GW 1100 may transfer the second IP flow identification information and the third IP flow identification information based on multiple possible procedures. For example, the second message may be a PMIPv6 PBU message, and the third message may be a PMIPv6 Proxy Binding ACK message. Or, the second message may be a GTP Create Session Request message, and the third message may be a GTP Create Session Response message. Or, the second message may be a GTP Bearer Resource Command message, and the third message may be a GTP Update Bearer Request message. Or, the second message may be a GTP Modify Bearer Request message, and the third message may be a GTP Modify Bearer Response message. It can be understood that, the first gateway device 1000 may also interact with the PDN GW 1100 based on other procedures, which are not exhaustively listed herein.

Figure 12:
FIG. 12 is a schematic diagram of a communications system according to an embodiment of the present invention.

Referring to FIG. 12, an embodiment of the present invention further provides a communications system, which may include a first gateway 1210 and a PDN GW 1220.

The first gateway 1210 is configured to receive a first message sent by a UE through a first access network, where the first message carries first IP flow identification information, and the first IP flow identification information is used to identify an IP flow that is transmitted by the UE through the first access network and/or an IP flow that is transmitted by the UE through a second access network, where the first access network and the second access network are access networks using different access technologies; send a second message to a PDN GW, where the second message carries second IP flow identification information, and the second IP flow identification information is the same as the first IP flow identification information or the second IP flow identification information is obtained based on the first IP flow identification information; receive a third message sent by the PDN GW, where the third message carries third IP flow identification information accepted by a network; and send a fourth message to the UE, where the fourth message carries fourth IP flow identification information, and the fourth IP flow identification information is the same as the third IP flow identification information or the fourth IP flow identification information is obtained based on the third IP flow identification information.

The PDN GW 1220 is configured to receive the second message sent by the first gateway 1210, establish a binding relationship between an IP flow routing address and the third IP flow identification information or the second IP flow identification information, where the third IP flow identification information is IP flow identification information accepted by a network, the third IP flow identification information is used to identify an IP flow that is allowed by the network to be transmitted by the UE through the first access network and/or an IP flow that is allowed by the network to be transmitted by the UE through the second access network, and the IP flow routing address includes at least one of the following addresses: a local address of the UE, an address of the first gateway 1210, and a home address of the UE; send the third message to the first gateway 1210.

It can be understood that, functions of the PDN GW 1220 and the first gateway 1210 in the communications system in this embodiment may be implemented by using the methods in the foregoing method embodiments. For the specific implementation process, reference may be made to the related description in the foregoing method embodiments, and details are not described herein again.

The first gateway 1210 may be, for example, the gateway device 800 or the gateway device 1000; the PDN GW 1220 may be, for example, the PDN GW 900 or the PDN GW 1100. Certainly, the first gateway 1210 and the PDN GW 1220 may also have other possible structures.

An embodiment of the present invention further provides a computer storage medium, where the computer storage medium may store a program. When the program is run, part or all of the steps of the data processing method recorded in the method embodiments are performed.

It should be noted that, for the methods according to the embodiments, to simplify the description, the methods are described as a combination of a series of actions, but a person skilled in the art should know that the present invention is not limited by the described action sequence, because according to the present invention, some steps may be performed in other sequences or simultaneously. In addition, the person skilled in the art should also know that, the embodiments described in the specification are all exemplary embodiments, and the related actions and modules are not necessarily required by the present invention.

In the foregoing embodiments, descriptions for the embodiments emphasize different aspects, and for a part without being described in detail in a certain embodiment, reference may be made to related descriptions in other embodiments.

An embodiment of the present invention further provides a computer storage medium, where the computer storage medium may store a program. When the program is run, part or all of the steps of the data flow control method recorded in the method embodiments are performed.

It should be noted that, for the methods according to the embodiments, to simplify the description, the methods are described as a combination of a series of actions, but a person skilled in the art should know that the present invention is not limited by the described action sequence, because according to the present invention, some steps may be performed in other sequences or simultaneously. In addition, the person skilled in the art should also know that, the embodiments described in the specification are all exemplary embodiments, and the related actions and modules are not necessarily required by the present invention.

In the foregoing embodiments, descriptions for the embodiments emphasize different aspects, and for a part without being described in detail in a certain embodiment, reference may be made to related descriptions in other embodiments.

In the embodiments provided in this application, it should be understood that, the disclosed apparatus may be implemented in other manners. For example, the described apparatus embodiments are merely exemplary. For example, the foregoing unit division is merely logical function division, and there may be other division manners in actual implementation. For example, multiple units or components may be combined or integrated into another system, or some features may be ignored or not performed. Furthermore, the shown or discussed coupling or direct coupling or communication connection may be accomplished through some interfaces, and indirect coupling or communication connection between devices or units may be electrical, mechanical, or in other forms.

The units described as separate components may be or may not be physically separated. Components shown as units may be or may not be physical units, that is, may be integrated or distributed to a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated units are implemented in the form of software functional units and sold or used as a separate product, the integrated units may be stored in a computer readable storage medium. Based on such comprehension, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, and the like) to execute all or a part of steps of the methods described in the embodiments of the present invention. The storage medium includes any medium that can store program code, such as a universal serial bus (USB) flash disk, a read-only memory (ROM), a random access memory (RAM), a removable hard disk, a magnetic disk, or an optical disc.

To sum up, the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, and these modifications or replacements do not make the essence of the corresponding technical solutions depart from the spirit and scope of the technical solutions of the embodiments of the present invention.

What is claimed is:

1. A data flow control method, comprising;
receiving, by a first gateway, a first message sent by a user equipment through a first access network, wherein the first message carries first Internet Protocol (IP) flow identification information, and the first IP flow identification information is used to identify at least one of an IP flow that is transmitted by the user equipment through the first access network or an IP flow that is transmitted by the user equipment through a second access network, wherein the first IP flow identification information comprises a source address, a source port number, a destination address, a destination port number, and a protocol type, and wherein the first access network and the second access network are access networks using different access technologies;
sending, by the first gateway, a second message to a packet data network gateway, wherein the second message carries second IP flow identification information, and the second IP flow identification information is the same as the first IP flow identification information or the second IP flow identification information is obtained based on the first IP flow identification information;
receiving, by the first gateway, a third message sent by the packet data network gateway, wherein the third message carries third IP flow identification information, and the third IP flow identification information is used to identify at least one of an flow that is allowed by a network to be transmitted by the user equipment through the first access network or an IP flow that is allowed by the network to be transmitted by the user equipment through the second access network; and
sending, by the first gateway, a fourth message to the user equipment, wherein the fourth message carries fourth IP flow identification information, and the fourth IP flow identification information is the same as the third IP flow identification information or the fourth IP flow identification information is obtained based on the third IP flow identification information.

2. The method according to claim 1, wherein at least one message of the first message, the second message, the third message, and the fourth message further carries an IP flow routing address, wherein the IP flow routing address comprises at least one of a local address of the user equipment, an address of the first gateway, or a home address of the user equipment.

3. The method according to claim 1, when the second IP flow identification information comprises quality of service information, that the second IP flow identification information is obtained based on the first IP flow identification information comprises: the quality of service information comprised in the second IP flow identification information is converted from quality of service information comprised in the first IP flow identification information; or when the fourth IP flow identification information comprises quality of service information, that the fourth IP flow identification information is obtained based on the third IP flow identification information comprises: quality of service information comprised in the fourth IP flow identification information is converted from quality of service information comprised in the third IP flow identification information.

4. The method according to claim 1, wherein the first message or the second message further carries a packet data network connection indication, wherein the packet data network connection indication is used to indicate a packet data network connection that has been established by the user equipment through the second access network, and wherein the IP flow transmitted by the user equipment through the first access network uses the packet data network connection.

5. The method according to claim 4, wherein the packet data network connection indication comprises at least one of the home address of the user equipment or a handover indication.

6. The method according to claim 1, wherein receiving the first message sent by the user equipment through the first access network comprises receiving an Internet Key Exchange protocol authentication request message sent by the user equipment, or receiving an Internet Key Exchange protocol informational request message sent by the user equipment.

7. The method according to claim 1, wherein before receiving the first message sent by the user equipment through the first access network, the method further comprises:
   receiving, by the first gateway, a fifth message sent by the user equipment through the first access network, wherein the fifth message carries fifth IP flow identification information, and the fifth IP flow identification information is used to identify at least one of the IP flow that is transmitted by the user equipment through the first access network or the IP flow that is transmitted by the user equipment through the second access network; and
   sending, by the first gateway, an authentication request message to an authentication server, and negotiating with the user equipment according to at least one of an operator policy returned by the authentication server or subscription data of the user equipment, to obtain the first IP flow identification information.

8. The method according to claim 1, wherein sending the second message to the packet data network gateway comprises sending a Proxy Mobile IP version 6 (IPv6) Proxy Binding Update message to the packet data network gateway, wherein receiving the third message sent by the packet data network gateway comprises receiving a Proxy Mobile IPv6 Proxy Binding acknowledge (ACK) message sent by the packet data network gateway, or wherein sending the second message to the packet data network gateway comprises sending a General Packet Radio Service Tunneling Protocol Create Session Request message to the packet data network gateway, wherein receiving the third message sent by the packet data network gateway comprises receiving a General Packet Radio Service Tunneling Protocol Create Session Response message sent by the packet data network gateway, or wherein sending the second message to the packet data network gateway comprises sending a General Packet Radio Service Tunneling Protocol Bearer Resource Command message to the packet data network gateway, wherein receiving the third message sent by the packet data network gateway comprises receiving a General Packet Radio Service Tunneling Protocol Update Bearer Request message sent by the packet data network gateway, or wherein sending the second message to the packet data network gateway comprises sending a General Packet Radio Service Tunneling Protocol Modify Bearer Request message to the packet data network gateway, and wherein receiving the third message sent by the packet data network gateway comprises receiving a General Packet Radio Service Tunneling Protocol Modify Bearer Response message sent by the packet data network gateway.

9. The method according to claim 1, wherein the first IP flow identification information further comprises quality of service information.

10. The method according to claim 1, wherein the first IP flow identification information further comprises at least one of a service type or an application type.

11. The method according to claim 1, wherein the first IP flow identification information further comprises a media type.

12. The method according to claim 1, wherein sending the fourth message to the user equipment comprises sending an Internet Key Exchange protocol authentication response message to the user equipment, or sending an Internet Key Exchange protocol informational response message to the user equipment.

13. A gateway device, comprising:
   a non-transitory computer readable medium having instructions stored thereon; and
   a computer processor coupled to the non-transitory computer readable medium and configured to execute the instructions to:
      receive a first message sent by a user equipment through a first access network, wherein the first message carries first Internet Protocol (IP) flow identification information, and the first IP flow identification information is used to identify at least one of an IP flow that is requested to be transmitted by the user equipment through the first access network or an IP flow that is requested to be transmitted by the user equipment through a second access network, wherein the first IP flow identification information comprises a source address, a source port number, a destination address, a destination port number, and a protocol type, and wherein the first access network and the second access network are access networks using different access technologies;
      send a second message to a packet data network gateway, wherein the second message carries second IP flow identification information, and the second IP flow identification information is the same as the first IP flow identification information or the second IP flow identification information is obtained based on the first IP flow identification information;
      receive a third message sent by the packet data network gateway, wherein the third message carries third IP flow identification information, and the third IP flow identification information is used to identify at least one of an IP flow that is allowed by a network to be transmitted by the user equipment through the first access network or an IP flow that is allowed by a network to he transmitted by the user equipment through the second access network; and send a fourth message to the user equipment, wherein the fourth message carries fourth IP flow identification information, and the fourth IP flow identification information is the same as the third IP flow identification information or the fourth IP flow identification information is obtained based on the third IP flow identification information.

14. The gateway device according to claim 13, wherein at least one message of the first message, the second message, the third message, and the fourth message further carries an IP flow routing address, wherein the IP flow routing address comprises at least one of a local address of the user equipment, an address of the gateway device, or a home address of the user equipment.

15. The gateway device according to claim 13, wherein the first message or the second message further carries a packet data network connection indication, wherein the packet data network connection indication is used to indicate a packet data network connection that has been established by the user equipment through the second access network, and wherein the IP flow transmitted by the user equipment through the first access network uses the packet data network connection.

16. The gateway device according to claim 13, wherein the first IP flow identification information is IP flow identification information obtained by modifying IP flow identification information currently used by the user equipment.

17. The gateway device according to claim 13, wherein the computer processor is further configured to execute the instructions to receive an Internet Key Exchange protocol authentication request message sent by the user equipment, or receive an Internet Key Exchange protocol informational request message sent by the user equipment.

18. The gateway device according to claim 13, wherein the computer processor is further configured to execute the instructions to:
receive a fifth message sent by the user equipment through the first access network before receiving the first message sent by the user equipment through the first access network, wherein the fifth message carries fifth IP flow identification information, and the fifth IP flow identification information is used to identify at least one of the IP flow that is transmitted by the user equipment through the first access network or the IP flow that is transmitted by the user equipment through the second access network;
send an authentication request message to an authentication server; and
negotiate with the user equipment according to at least one of an operator policy returned by the authentication server or subscription data of the user equipment returned by the authentication server, to obtain the first IP flow identification information.

19. The gateway device according to claim 13, wherein the computer processor is further configured to execute the instructions to:
send a Proxy Mobile IP version 6 (IPv6) Proxy Binding Update message to the packet data network gateway, receive a Proxy Mobile IPv6 Proxy Binding acknowledge (ACK) message sent by the packet data network gateway; or send a General Packet Radio Service Tunneling Protocol Create Session Request message to the packet data network gateway, receive a General Packet Radio Service Tunneling Protocol Create Session Response message sent by the packet data network gateway; or send a General Packet Radio Service Tunneling Protocol Bearer Resource Command message to the packet data network gateway, receive a General Packet Radio Service Tunneling Protocol Update Bearer Request message sent by the packet data network gateway; or send a General Packet Radio Service Tunneling Protocol Modify Bearer Request message to the packet data network gateway, and wherein the second receiving unit is configured to receive a General Packet Radio Service Tunneling Protocol Modify Bearer Response message sent by the packet data network gateway.

20. The gateway device according to claim 13, wherein the computer processor is further configured to execute the instructions to send an Internet Key Exchange protocol authentication response message to the user equipment, or send an Internet Key Exchange protocol informational response message to the user equipment.

21. A data flow control method, comprising:
receiving, by a first gateway, a first message sent by a user equipment through a first access network, wherein the first message carries first Internet Protocol (IP) flow identification information, and the first IP flow identification information is used to identify at least one of an IP flow that is transmitted by the user equipment through the first access network or an IP flow that is transmitted by the user equipment through a second access network, and wherein the first access network and the second access network are access networks using different access technologies;
sending, by the first gateway, a second message to a packet data network gateway, wherein. the second message carries second IP flow identification information, and the second IP flow identification information is the same as the first IP flow identification information or the second IP flow identification information is obtained based on the first IP flow identification information;
receiving, by the first gateway, a third message sent by the packet data network gateway, wherein the third message carries third IP flow identification information, and the third IP flow identification information is used to identify at least one of an IP flow that is allowed by a network to be transmitted by the user equipment through the first access network or an IP flow that is allowed by the network to be transmitted by the user equipment through the second access network; and
sending, by the first gateway, a fourth message to the user equipment, wherein the fourth message carries fourth IP flow identification information, and the fourth IP flow identification information is the same as the third IP flow identification information or the fourth IP flow identification information is obtained based on the third IP flow identification information, and
wherein when the second IP flow identification information comprises quality of service information, that the second IP flow identification information is Obtained based on the first IP flow identification information comprises the quality of service information comprised in the second IP flow identification information is converted from quality of service information comprised in the first IP flow identification information, or wherein when the fourth IP flow identification information comprises quality of service information, that the fourth IP flow identification information is obtained based on the third IP flow identification information comprises quality of service information comprised in the fourth IP flow identification information is converted from quality of service information comprised in the third IP flow identification information.

22. A data flow control method, comprising:

receiving, by a first gateway, a first message sent by a user equipment through a first access network, wherein the first message carries first Internet Protocol (IP) flow identification information, and the first IP flow identification information is used to identify at least one of an IP flow that is transmitted by the user equipment through the first access network or an IP flow that is transmitted by the user equipment through a second access network, wherein the first IP flow identification comprises at least one of a service type or an application type, and wherein the first access network and the second access network are access networks using different access technologies;

sending, by the first gateway, a second message to a packet data network gateway, wherein the second message carries second IP flow identification information, and the second IP flow identification information is the same as the first IP flow identification information or the second IP flow identification information is obtained based on the first IP flow identification information;

receiving, by the first gateway, a third message sent by the packet data network gateway, wherein the third message carries third IP flow identification information, and the third IP flow identification information is used to identify at least one of an IP flow that is allowed by a network to be transmitted by the user equipment through the first access network or an IP flow that is allowed by the network to be transmitted by the user equipment through the second access network; and sending, by the first gateway, a fourth message to the user equipment, wherein the fourth message carries fourth IP flow identification information, and the fourth IP flow identification information is the same as the third IP flow identification information or the fourth IP flow identification information is obtained based on the third IP flow identification information.

23. A data flow control method, comprising:

receiving, by a first gateway, a first message sent by a user equipment through a first access network, wherein the first message carries first Internet Protocol (IP) flow identification information, and the first IP flow identification information is used to identify at least one of an IP flow that is transmitted by the user equipment through the first access network or an IP flow that is transmitted by the user equipment through a second access network, wherein the first IP flow identification information comprises a media type, and wherein the first access network and the second access network are access networks using different access technologies;

sending, by the first gateway, a second message to a packet data network gateway, wherein the second message carries second IP flow identification information, and the second IP flow identification information is the same as the first IP flow identification information or the second IP flow identification information is obtained based on the first IP flow identification information;

receiving, by the first gateway, a third message sent by the packet data network gateway, wherein the third message carries third IP flow identification information, and the third IP flow identification information is used to identify at least one of an IP flow that is allowed by a network to be transmitted by the user equipment through the first access network or an IP flow that is allowed by the network to be transmitted by the user equipment through the second access network; and sending, by the first gateway, a fourth message to the user equipment, wherein the fourth message carries fourth IP flow identification information, and the fourth IP flow identification information is the same as the third IP flow identification information or the fourth IP flow identification information is obtained based on the third IP flow identification information.

* * * * *

UNITED STATES PATENT AND TRADEMARK OFFICE
CERTIFICATE OF CORRECTION

PATENT NO. : 9,717,019 B2
APPLICATION NO. : 14/583951
DATED : July 25, 2017
INVENTOR(S) : Xiaoyan Duan et al.

Page 1 of 1

It is certified that error appears in the above-identified patent and that said Letters Patent is hereby corrected as shown below:

In the Claims

Column 40, Line 53, Claim 1 should read:
to identify at least one of an IP flow that is allowed by a Column 43, Line 5, Claim 13 should read:
netword to be transmitted by the user equipment Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*